United States Patent
Tsumura

(10) Patent No.: US 6,574,200 B1
(45) Date of Patent: Jun. 3, 2003

(54) CDMA RECEIVER COMPRISING A SYNCHRONOUS TIMING NOTIFYING SECTION CAPABLE OF REACHING LOW CONSUMPTION OF CURRENT

(75) Inventor: Soichi Tsumura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/387,296

(22) Filed: Aug. 31, 1999

(30) Foreign Application Priority Data

Sep. 1, 1998 (JP) .......................................... 10-247029

(51) Int. Cl.[7] .............................................. G08C 17/00
(52) U.S. Cl. ...................................... 370/311; 455/574
(58) Field of Search ........................ 370/311; 455/572, 455/574, 343, 550, 255, 256

(56) References Cited

U.S. PATENT DOCUMENTS

| | | | | |
|---|---|---|---|---|
| 5,737,323 A | * | 4/1998 | Lansdowne ................. | 340/7.38 |
| 5,740,129 A | * | 4/1998 | Frampton .................... | 368/10 |
| 5,950,120 A | * | 9/1999 | Gardner et al. ............. | 455/343 |
| 5,995,820 A | * | 11/1999 | Young et al. ............... | 340/7.38 |
| 6,009,319 A | * | 12/1999 | Khullar et al. .............. | 370/311 |
| 6,016,312 A | * | 1/2000 | Storm et al. ................ | 340/7.34 |
| 6,088,602 A | * | 7/2000 | Banister ..................... | 340/7.34 |

FOREIGN PATENT DOCUMENTS

| | | |
|---|---|---|
| JP | 5-191375 | 7/1993 |
| JP | 7-123024 | 5/1995 |
| JP | 8-321804 | 12/1996 |
| JP | 9-18405 | 1/1997 |
| JP | 9-284151 | 10/1997 |
| JP | 9-321667 | 12/1997 |

* cited by examiner

Primary Examiner—Nay Maung
Assistant Examiner—Lewis West
(74) Attorney, Agent, or Firm—Dickstein, Shapiro, Morin & Oshinsky, LLP.

(57) ABSTRACT

In a CDMA receiver for intermittently receiving a spread spectrum received signal using a despreading code and comprising a high-resolution time reference generating section and a low-resolution time reference generating section, a state control section puts, for substantially a reception operation stop time interval, the CDMA receiver into a cold standby state where the high-resolution time reference generating section does not operate while the low-resolution time reference generating section operates. On or immediately before a reception return time instant, the state control section puts the CDMA receiver into a hot standby state where the high-resolution time reference generating section operates.

48 Claims, 19 Drawing Sheets

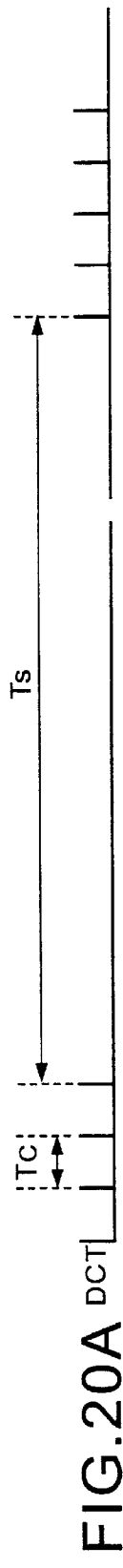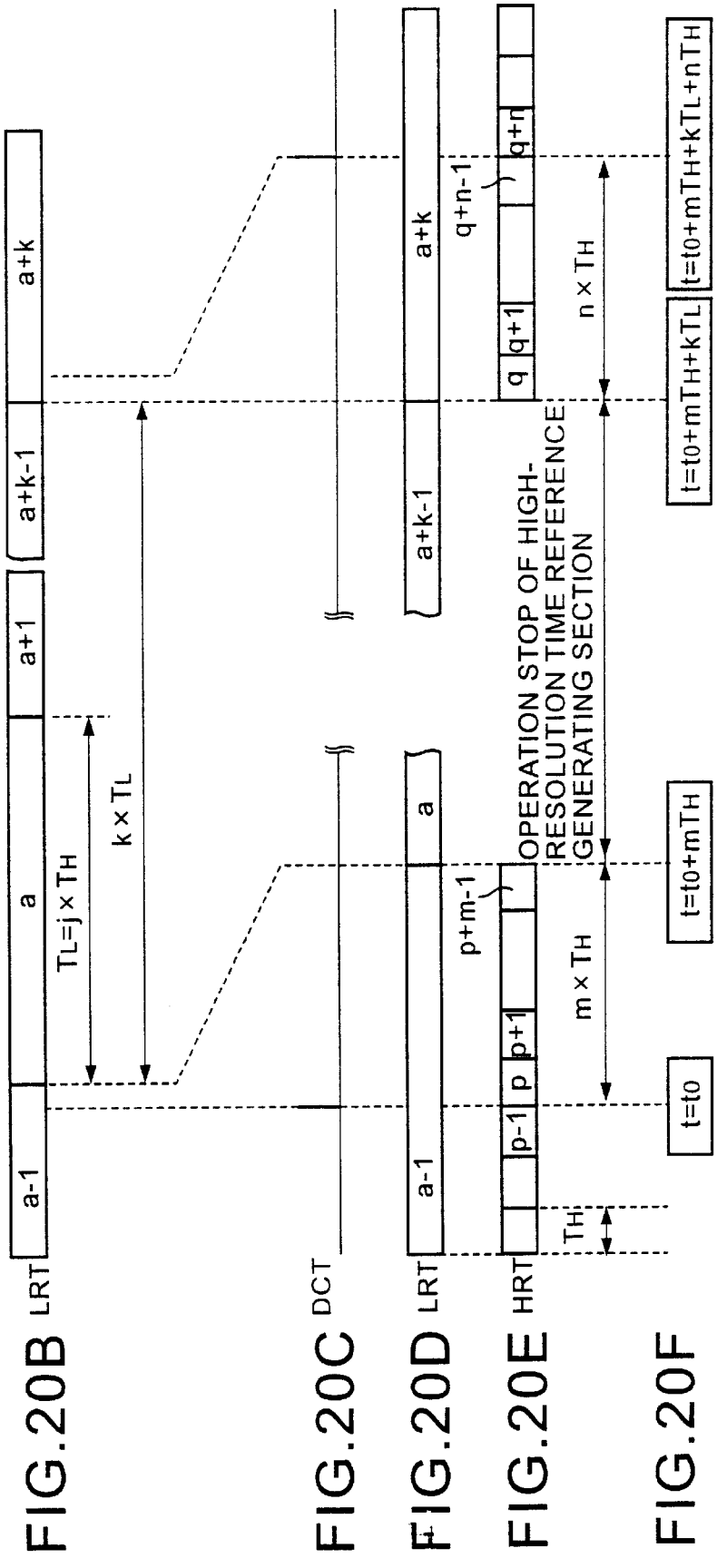

CDMA RECEIVER COMPRISING A SYNCHRONOUS TIMING NOTIFYING SECTION CAPABLE OF REACHING LOW CONSUMPTION OF CURRENT

BACKGROUND OF THE INVENTION

This invention relates to a receiver which is intermittently operable and, more particularly, to a technique which can make a code division multiple access (CDMA) receiver intermittently carry out reception operation.

Recently, development of a mobile communication system is remarkable and there have been strong demands in the fields of mobile communication terminals for use in the mobile communication system. In general, each of the mobile communication terminals of the type described in driven by a battery which has a finite lifetime. Accordingly, in order to extend a use time in the mobile communication terminal without replacement of the battery frequently, it is necessary to remove consumption of useless current in the mobile communication terminals as much as possible. As such technique, in a case where the mobile communication terminal is put into a wait state, a method of making the mobile communication terminal operate intermittently is adapted.

In a case where this intermittent operation is realized in a spread spectrum technique such as the code division multiple access (CDMA), attentions will be made as regards points which will presently be described.

In general, it is known as characteristics in the receiver for receiving a spread spectrum received signal such as a CDMA receiver that reception information itself cannot be decoded if a synchronous state between the spread spectrum received signal and a despreading code for use in despreading is strictly matched. In addition, for this purpose, a clock signal used as a reference signal of synchronous timings preferably has a high frequency and is stable.

Those situations are required not during reception but also in a case of making the receiver establish the synchronous state operate intermittently. That is, it is necessary to ensure a correct synchronization between the spread spectrum received signal and the despreading code as rapidly as possible on making the receiver operate intermittently transit from a reception operation stop state to a reception operation state.

Under the circumstances, that is, in consideration of a balance of the above-mentioned low consumption of current and necessity of a rapid synchronous acquisition on transiting from the reception operation stop state to the reception operation state, various conventional methods are already proposed as methods for making the receivers such as the CDMA receivers operate intermittently. The conventional methods are classified into first and second conventional methods as follows.

The first conventional method comprises the step of making only a high-frequency oscillation section operate when operations of other receiving parts stop during the reception operation stop state in an intermittent operation state, thereby holding a synchronous established state. The high-frequency oscillation section comprises a high-frequency oscillator acting as a time reference oscillator for high precision and a high-speed counter for frequency dividing a high frequency signal outputted from the high-frequency oscillator to produce a divide signal. That is, in the first conventional method, the receiver is put into, during the intermittent operation state, a hot standby state where the high-frequency oscillation section operates while the operations of the other receiving parts stop for a reception operation stop time interval of the reception operation stop state.

The second conventional method comprises the step of resetting a phase state of the despreading code whenever the receiver is put into the reception operation state in the intermittent operation state to resynchronize the despreading code to the spread spectrum received signal in accordance with an initial synchronous acquisition procedure. In other words, in the second conventional method, the receiver is put into, during the intermittent operation state, a sleep state where operation of the high-frequency oscillation section stop for the reception operation stop time interval.

Various CDMA receivers of the type are already known. By way of example, Japanese Unexamined Patent Publication of Tokkai No. Hei 5-191,375 or JP-A 5-191375 discloses a spread spectrum system receiving equipment which is capable of execute a synchronous acquisition of a spreading code in a short time at the time of dormant state in an intermittent receiving operation and which is capable of reducing the power consumption. According to JP-A 5-191375, in the case of switching to a dormant state from reception at the time of intermittent receiving operation, a switch is connected to a fixed frequency oscillating circuit, and by driving a local spreading code generating circuit by its free-running clock, a phase difference of a spreading code is prevented from becoming large, the switch is connected to a phase delaying circuit, a phase of a local spreading code generated by the code generating circuit is delayed by a portion of a phase shift of the local spreading code estimated at the time of dormant state, and subsequently, the switch is connected to a phase advancing circuit, so that a phase of an output of the code generating circuit advances little by little, and at the moment a large correlation value is generated in an output of a correlator in such a state, the switch is connected a delay lock loop, and switched to a regular synchronization tracking operation.

Japanese Unexamined Patent Publication of Tokkai No. Hei 7-123,024 or JP-A 7-123024 discloses a method for initial pull-in of automatic frequency control and its receiver in which a time required when initial pull-in of automatic frequency control is made available in a spread spectrum communication. According to JP-A 7-123014, an AFC circuit is composed of a mixer, an A/D converter, a digital matched filter (DMF), an oscillator (OSC), a frequency discriminator, a D/A converter, an AFC control circuit, and a voltage controlled oscillator (VCO). Then, a sample clock frequency outputted from the oscillator is selected to be a frequency higher than or lower than one-chip frequency of a chip clock frequency of a sender side included in a received IF input by about two cycles. Thus, fluctuation in the correlation due to frequency deviation between transmission and reception clock signals is suppressed in a short time and the clock generated from the voltage controlled oscillator is synchronized quickly with the chip clock frequency.

Japanese Unexamined Patent Publication of Tokkai No. Hei 8-321,804 or JP-A 8-321804 discloses a communication terminal equipment.which is capable of considerable reducing power consumption at the time of intermittent reception in the communication terminal equipment. According to JP-A 8-321804, the state value of a second spreading code generation means at the time of next starting is set in a register means and a timer means is operated. Second and first spreading code generation means and a reception system circuit are stopped and a system becomes a sleep state.

At the time or restarting by the time-out of the timer means, the reception system circuit is operated and the second spreading code generating means is operated from the state value which is set in the register means. Furthermore, an intermittent reception means operating the first spreading code generation means from an initial state is provided. Thus, the first and second spreading code generation means can be stopped at the time of non-reception, and power consumption at the time of intermittent reception can considerably be reduced.

Japanese Unexamined Patent Publication of Tokkai No. Hei 9-284,151 or JP-A 9-284151 discloses a receiver, a reception method, and a communication system which are capable of keeping the synchronization precision in the standby state and of caving the power consumption. According to JP-A 9-284151, a control circuit applies power supply control or the like to each circuit such as a synchronization correction signal generating circuit, a pseudo-noise (PN) code generator and an information decoding circuit in each independent timing. The control circuit controls driving the information decoding circuit once for N times of driving each circuit such as the synchronization correction signal generating circuit synchronously with the timing of driving each circuit such as the synchronization correction signal generating circuit.

Japanese Unexamined Patent Publication of Tokkai No. Hei 9-321,667 or JP-A 9-321667 discloses a receiver for a CDMA (code division multiple access) system which is capable of reducing the power consumption in the standby state thereof. According to JP-A 9-321667, a received spread spectrum signal is demodulated into base band signals at multipliers and the demodulated signals are given to a complex matched filter. The complex matched filter is driven intermittently by a power supply control section to attain synchronization acquisition of a reception signal. When a power calculation section detects that an output of the complex matched filter has a peak output of a prescribed value or over, a correlation device control section operates n-sets of correlation devices and synchronization of the reception signal is traced and despread is conducted, outputs of the correlation devices are subjected to RAKE synthesis at a RAKE synthesis and demodulation section and demodulated.

Although the above-mentioned Japanese Unexamined Patent Publications are different from one another in detail, those Publications are roughly divided into the above-mentioned first and second conventional methods.

As described above, on making the conventional CDMA receiver operate intermittently, the correct synchronization between the spread spectrum received signal and the despreading code is ensured whenever a reception operation is started by adopting either the first conventional method or the second conventional method.

However, all of the above-mentioned first and second conventional methods have peculiar problems in the manner which will presently be described, each of the above-mentioned first and second conventional methods is difficult to realize the intermittent operation which can scheme true low consumption of current.

The first conventional method makes the components except for the high-frequency oscillation section operate intermittently as described above and it is therefore impossible to stop operation of the high frequency oscillation section. In general, as being understood from the lifetime of the battery in such a clock or watch, a low-frequency oscillator and a low-speed counter arc operable in extremely small current while the high-frequency oscillator and the high-speed counter consume relatively large current. However, in spite of necessary of the relatively large current, the first conventional method cannot stop the operation of the high-frequency oscillator and the high-speed counter and it results in decreasing a degradation effect of the consumed current due to the intermittent operation. In addition, as described above, inasmuch as precision in a measured time interval is good when a reference oscillator has a high oscillator frequency and is stable in a case where a time measurement is carried out in the receiver by using a free-running oscillator, it is impossible to simply replace a combination of the high-frequency oscillator and the high-speed counter with a combination of the low-frequency oscillator and the low-speed counter.

On the other hand, it is difficult in the second conventional method to carry out a rapid synchronous acquisition without increase in the consumed current in a case where the state is transited from the stop state to the operating state. Specifically, if the second conventional method is adopted with the low consumption of current maintained, the conventional method takes longer to resynchronize. As a result, the receiver must start resynchronization operation after a lapse of a short time interval from a time when the receiving operation stops and the receiver may have a substantially short time interval for which the receiver can stop the receiving operation. Under the circumstances, the degradation effect of the consumed current due to the intermittent operation lowers. In addition, the second conventional method is disadvantageous in that it is impossible to carry out the intermittent operation itself in extreme case.

SUMMARY OF THE INVENTION

It is therefore an object of this invention to provide a receiver and an intermittent receiving method, which are capable of really reaching low consumption of current.

Other objects of this invention will become clear as the description proceeds.

On describing the gist of an aspect of this invention, it is possible to be understood that a code division multiple access (CDMA) receiver intermittently receives a spread spectrum received signal using a despreading code having a chip duration. The CDMA receiver is alternately put into a reception operation state and a reception operation stop state for an intermittent reception state. The reception operation stop state continues for a reception operation stop time interval between a reception stop starting time instant and a reception return time instant.

According to the aspect of this invention, the above-understood CDMA receiver comprises a high-resolution time reference generating section for generating a high-resolution timing signal having a high-resolution period which is shorter than the chip duration and a low-resolution time reference generating section for generating a low-resolution timing signal having a low-resolution period which is longer than the high-resolution period. Connected to the high-resolution time reference generating section, a state control section puts, for substantially the operation stop time interval, the CDMA receiver into a cold standby state where the high-resolution time reference generating section does not operate while the low-resolution time reference generating section operates. On or immediately before the reception return time instant, the state control section puts the CDMA receiver into a hot standby state where the high-resolution time reference generating section operates.

On describing the gist of an aspect of this invention, it is possible to be understood that a method is of intermittently receiving a spread spectrum received signal using a despreading code having a chip duration in a code division multiple access (CDMA) receiver which is alternately put into a reception operation state and a reception operation stop state for an intermittent reception state. The reception operation stop state continues for a reception operation stop time interval between a reception stop starting time instant and a reception return time instant. The CDMA receiver comprises a high-resolution time reference generating section for generating a high-resolution timing signal having a high-resolution period which is shorter than the chip duration and a low-resolution time reference generating section for generating a low-resolution timing signal having a low-resolution period which is longer than the high-resolution period.

According to this invention, the afore-mentioned method comprises the steps of putting, for substantially the operation stop time interval, the CDMA receiver into a cold standby state where the high-resolution time reference generating section does not operate while the low-resolution time reference generating section operates and of putting, on or immediately before the reception return time instant, the CDMA receiver into a hot standby state where the high-resolution time reference generating section operates.

BRIEF DESCRIPTION OF THE DRAWING

FIGS. 20A through 20F are time charts showing operation timings of each part in an intermittent reception state of a synchronous timing notifying section for use in a CDMA terminal according to a further embodiment of this invention.

DESCRIPTION OF THE PREFERRED EMBODIMENTS

Figure 1:
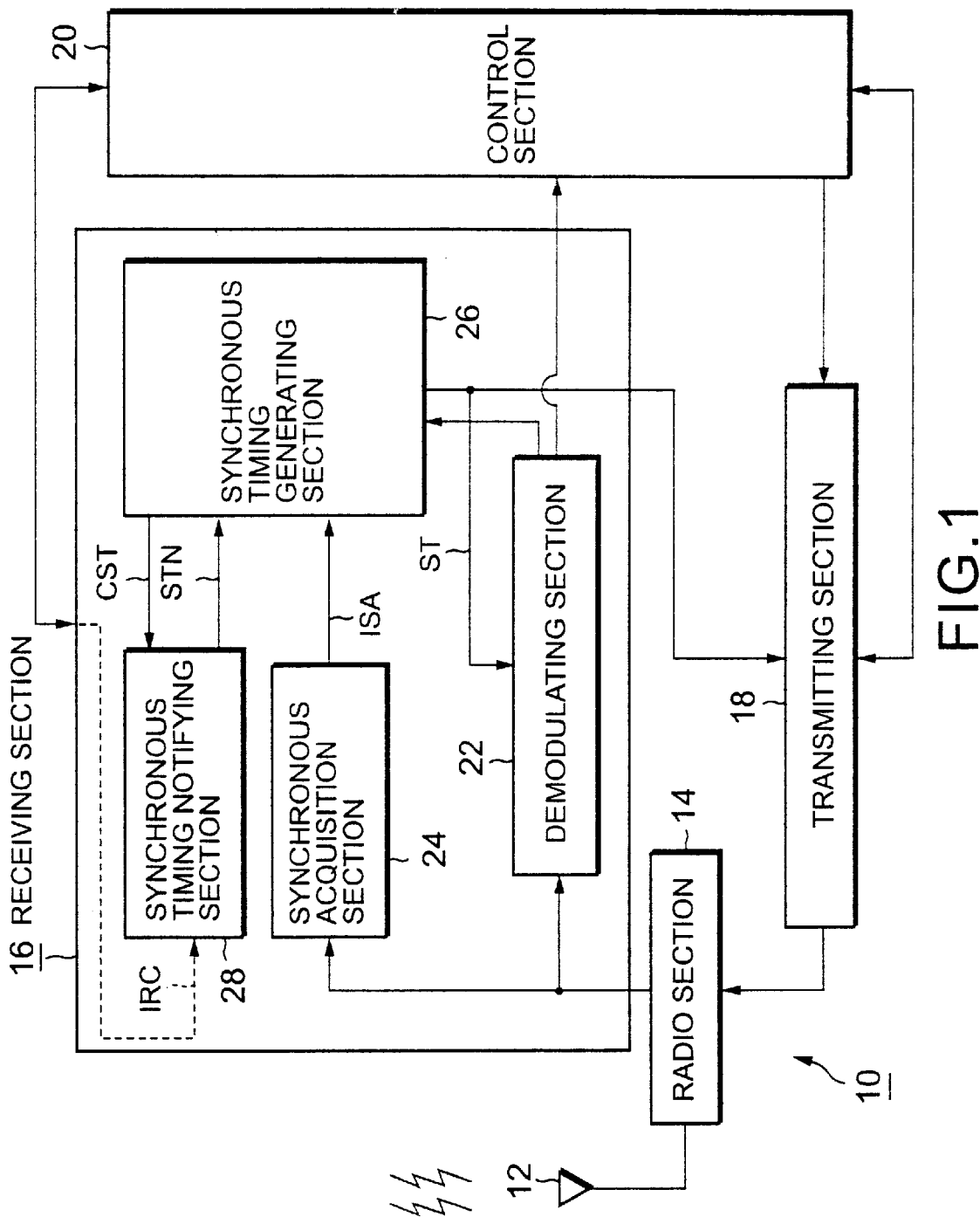
FIG. 1 is a block diagram of a code division multiple access (CDMA) terminal according to a first embodiment of this invention.

Now, description will proceed to preferred embodiments of this invention with reference to the drawing. In addition, in the embodiments, the description will be made as regards examples of relationship between a receiving section and a control section in a code division multiple access (CDMA) terminal without an independent receiver.

Referring to FIG. 1, the description will proceed to the CDMA terminal 10 according to a first embodiment of this invention. The illustrated CDMA terminal 10 comprises an antenna 12, a radio section 14, a receiving section 16, a transmitting section 18, and a control section 20. The receiving section 16 serves as a CDMA receiver.

The radio section 14 is connected to the antenna 12, the receiving section 16, and the transmitting section 18. Received from the antenna 12, a spread spectrum received signal is supplied to the radio section 14. The radio section 14 sends the spread spectrum received signal to the receiving section 16. Produced by from the transmitting section 18, a spread spectrum transmission signal is supplied to the radio section 14. The radio section 14 transmits the spread spectrum transmission signal via the antenna 12.

The receiving section 16 correctly synchronizes a despreading code with the spread spectrum received signal and demodulates the spread spectrum received signal using a despreading code having a chip duration Tc to produce a demodulated signal which is sent to the control section 20. The receiving section 16 comprises a demodulating section 22, a synchronous acquisition section 24, a synchronous timing generating section 26, and a synchronous timing notifying section 28. The synchronous timing generating section 26 generates a synchronous timing signal for synchronizing the despreading code with the spread spectrum received signal. The synchronous timing notifying section 28 generates a synchronous timing notification signal for notifying the synchronous timing generating section 26 of a synchronous timing on return.

The control section 20 controls all of the CDMA terminal 10 and includes a central processing unit (CPU) (not shown) for carrying out various control processing, a speaker (not shown) and a microphone (not shown) which serve as external interfaces.

On a normal or continuous receiving operation, the receiving section 16 synchronizes the despreading code with the spread spectrum received signal in accordance with the synchronous timing signal generated from the synchronous timing generating section 26. More specifically, in the normal receiving operation, the synchronous acquisition section 24 carries out an initial synchronous acquisition on the basis of the spread spectrum received signal supplied from the radio section 14 to notify the synchronous timing generating section 26 of an initial synchronous acquisition signal ISA. Responsive to the initial synchronous acquisition signal ISA, the synchronous timing generating section 26 initially determines synchronous timing to generate a synchronous timing signal which is supplied to the demodulating section 22 and the transmitting section 18. Thereafter, the synchronous timing generating section 26 acquires a synchronous state in the demodulating section 22 to send the synchronous timing signal ST to the demodulating section 22 so as to follow acquired synchronization. Responsive to the synchronous timing signal ST supplied from the synchronous timing generating section 26, the demodulating section 22 synchronizes the despreading code with the spread spectrum received signal to demodulate the spread spectrum received signal into the demodulated signal which is supplied to the control section 20. While this operation is carried out, the synchronous timing notifying section 28 is supplied from the synchronous timing generating section 26 with a current synchronous timing signal CST indicative of a current synchronous state.

It is possible in the receiving section 16 carrying out such as a receiving processing to carry out an intermittent reception operation where the receiving section 16 is alternately put into a reception operation state and a reception operation stop state. In addition, a time interval (which is depicted at Ts in FIG. 3B) of the reception operation stop state is determined in dependency on a system and is preliminarily before the receiving section 16 is put into the intermittent reception state. The time interval Ts is called a reception operation stop time interval.

In FIG. 1, the control section 20 produces control signals a part of which is supplied to the synchronous timing notifying section 100 as illustrated in a broken line in the receiving section 16. This is because this invention mainly has a characteristic in an operation in the synchronous timing notifying section 28. Accordingly, the control signals for the demodulating section 22, the synchronous acquisition section 24, and the synchronous timing generating section 26 are omitted from figure because no description of this invention is required. As a result, prior art may be applied to the intermittent operation which is carried out, in accordance with the control signals from the control section 20, in the components in the receiving section 16 except for the synchronous timing notifying section 28. Throughout this specification described hereinafter, the control signal supplied from the control section 20 to the synchronous timing notifying section 16 is especially called an intermittent receiving control signal IRC in order to distinguish from the other control signals for other components.

Responsive to the intermittent receiving control signal IRC and the current synchronous timing signal CST, the synchronous timing notifying section 28 notifies the synchronous timing generating section 26 of a synchronous timing notification signal STN indicative of a correct synchronous timing on returning from the receiving operation stop state. In addition, the synchronous timing notifying section 28 carries out, in response to the intermittent receiving control signal IRC supplied from the control section 20, the intermittent operation in the similar manner as the other components.

Figure 2:
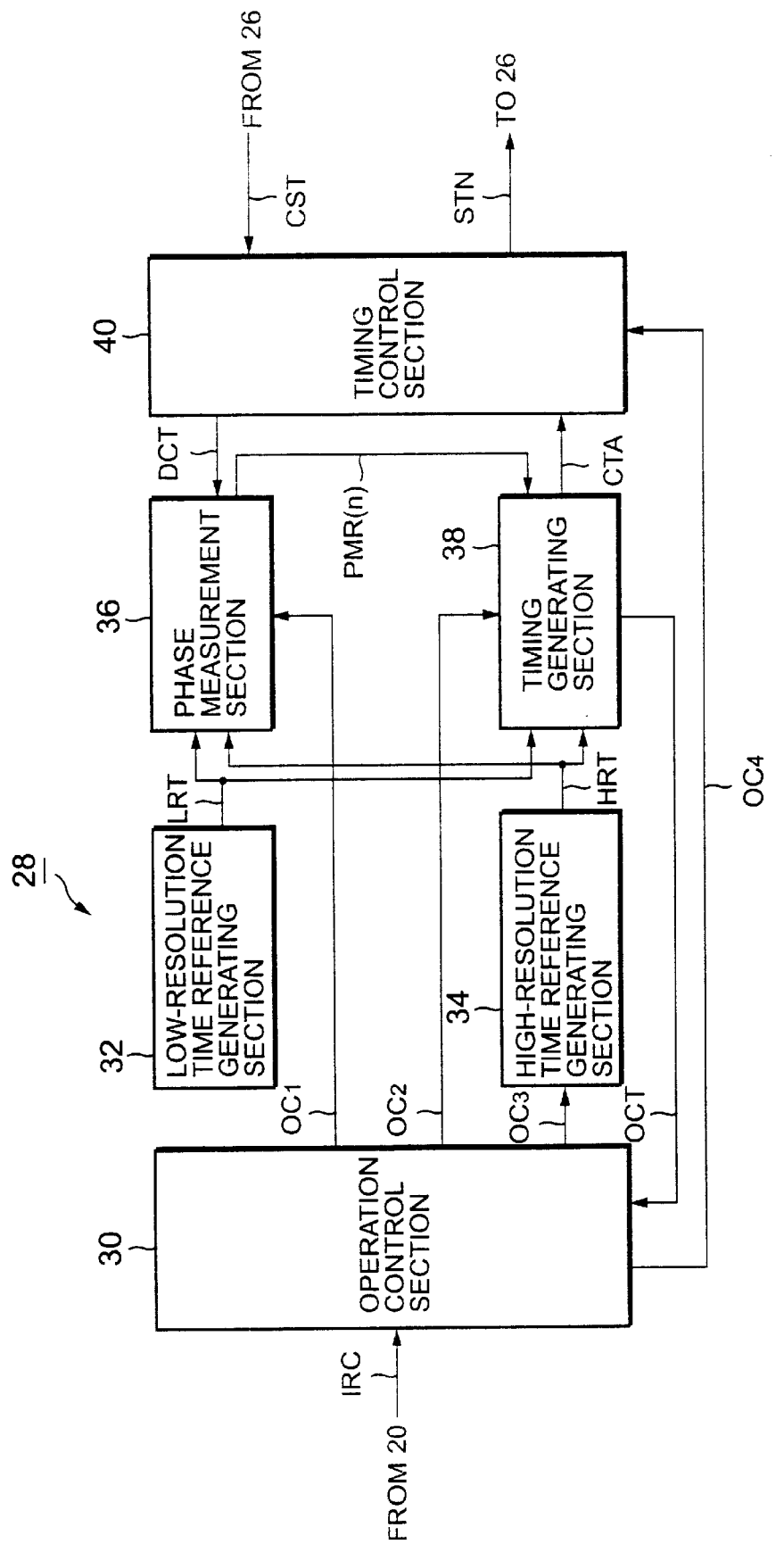
FIG. 2 is a block diagram of a synchronous timing notifying section for use in the CDMA terminal illustrated in FIG. 1.

Turning to FIG. 2, the synchronous timing notifying section 28 comprises an operation control section 30, a low-resolution time reference generating section 32, a high-resolution time reference generating section 34, a phase fen measurement section 36, a timing generating section 38, and a timing control section 40.

The low-resolution time reference generating section 32 generates a low-resolution timing signal LRT having a low-resolution period $T_L$. The high-resolution time reference generating section 34 generates a high-resolution timing signal HRT having a high-resolution period $T_H$ in the manner which will later become clear. In order to notify the synchronous timing generating section 26 of the correct synchronous timing, the synchronous timing notifying section 28 uses a combination of a multiple of the low-resolution period $T_L$ of the low-resolution timing signal LRT and a multiple of the high-resolution period $T_H$ of the high-resolution timing signal HLT. That is, the synchronous timing notifying section 28 measures a time interval between a time instant when the receiving section 16 is put into the reception operation stop state and a time instant when the receiving section 16 is turned back to the reception operation state as a time interval which is obtained by combining the multiple of the low-resolution period $T_L$ of the low-resolution timing signal LRT and the multiple of the high-resolution period $T_H$ of the high-resolution timing signal HRT. In addition, the low-resolution period $T_L$ of the low-resolution timing signal LRT may desirably be a multiple of the high-resolution period $T_H$ of the high-resolution timing signal HRT.

In the manner which will later become clear, although illustration is omitted from FIG. 2, the low-resolution time reference generating section 32 comprises a low-frequency oscillator and a low-speed counter while the high-resolution time reference generating section 34 comprises a high-frequency oscillator having a high frequency precision and a high-speed counter. The low-frequency oscillator oscillates a low-frequency signal having a low frequency. The low-speed counter frequency divides the low-frequency signal into a low-speed divided signal as the low-resolution timing signal LRT. The high-frequency oscillator oscillates a high-frequency signal having a high frequency. The high-speed counter frequency divides the high-frequency signal into a high-speed divided signal as the high-resolution timing signal HRT.

As described above, inasmuch as the synchronous timing notifying section 28 measures the reception operation stop time interval Ts indicative of the reception operation stop state by using a combination of the multiple of the low-resolution period $T_L$ of the low-resolution timing signal LRT and the multiple of the high-resolution period $T_H$ of the high-resolution timing signal HRT, there is a time interval for which it is unnecessary for the high-resolution time reference generating section 34 to operate while only the low-resolution time reference generating section 32 may operate. Accordingly, it is possible to stop operation of a portion including the high-resolution time reference generating section 34 except for the low-resolution time reference generating section 32 and a part accompanied thereto. As a result, it is possible to realize the low consumption of current in the whole system on the intermittent receiving operation. In addition, throughout the specification described hereinafter, a state where the operation of the high-resolution time reference generating section 34 stops in the reception operation stop time interval Ts while the low-resolution time reference generating section 32 operates is called a cold standby state in order to distinguish from the sleep state and the hot standby state.

To combine the multiple of the low-resolution period $T_L$ of the low-resolution timing signal LRT with the multiple of the high-resolution period $T_H$ of the high-resolution timing signal HRT means to correct a low frequency precision of the low-frequency oscillator and a rough time resolution of the low-speed counter by using the high-frequency oscillator and the high-speed counter. Accordingly, the synchronous timing on returning from the reception operation stop state to the reception operation state is substantially equal to that in a case where the reception operation stop time interval Ts of the reception operation stop state is measured by using only the multiple of the high-resolution period $T_H$ of the high-resolution timing signal HRT. As a result, it is unnecessary for the receiving section 16 to carry out the initial synchronous acquisition again on returning from the reception operation stop state to the reception operation state. Alternatively, the receiving section 16 only may carry out a resynchronous acquisition with respect to a plurality of despreading codes obtained by shifting an original despreading code from a predicted center phase therefor forward or backward by several multiples of the high-resolution period $T_H$ of the high-resolution timing signal HRT.

In addition, it will be assumed that the low-resolution period $T_L$ of the low-resolution timing signal LRT is the multiple of the high-resolution period $T_H$ of the high-resolution timing signal HRT. In this event, the number of the despreading codes for trying the re-synchronous acquisition may be three which correspond to the predicted center phase and two phases by which the original despreading code is shifted from the predicted center phase forward and backward by the high-resolution period $T_H$.

At any rate, it is possible for the receiving section 16 to rapidly ensure the synchronization on returning from the reception operation stop state to the reception operation state. As describing an example of a numerical value.in a general CDMA terminal, a time interval for the initial synchronous acquisition is equal to about two seconds but the time interval of about two seconds is not required in the embodiment on returning from the reception operation stop state to the reception operation state. In addition, although there is no description for a reference clock signal for making the circuit operate, one of the high-frequency signal and the low-frequency signal maybe used as the reference clock signal. This is because either the low-resolution time reference generating section 34 or the high-resolution time reference generating section 32 is always put into an operation state.

Figure 3:
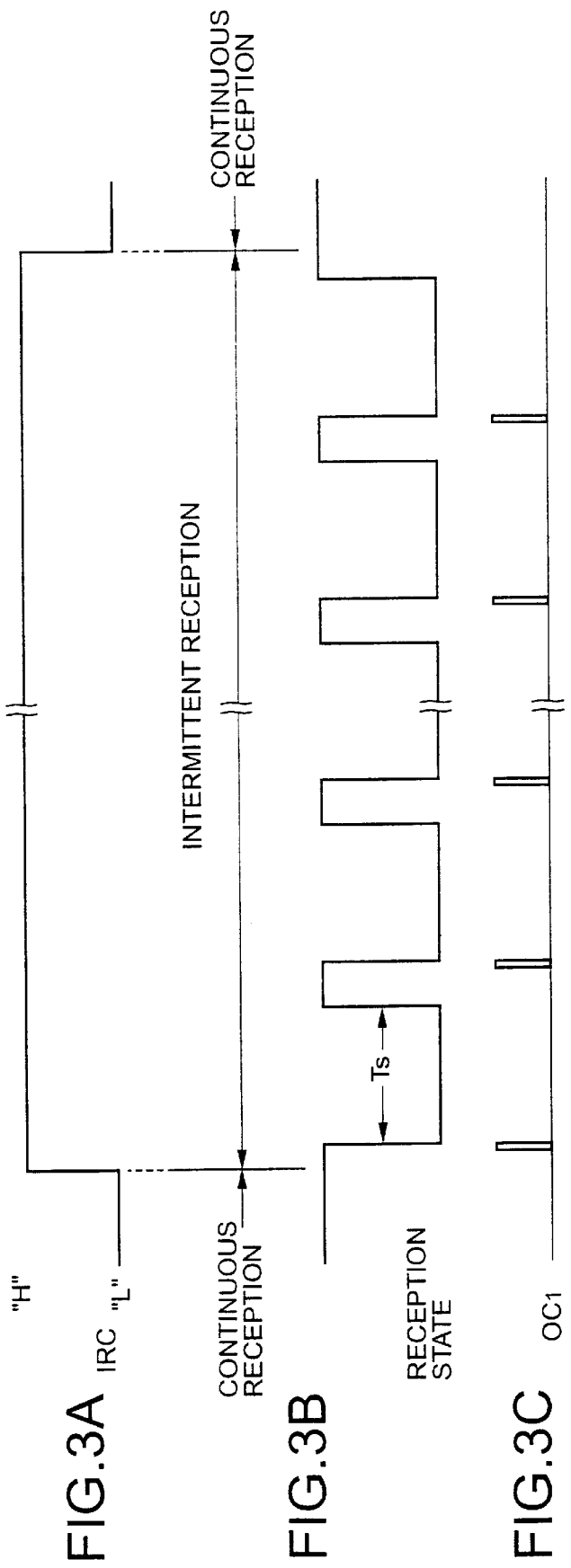
FIGS. 3A through 3C are time charts for use in describing operation in an intermittent reception state of the CDMA terminal illustrated in FIG. 1.

Turning to FIGS. 3A, 3B, and 3C, the description will proceed to a reception state of the receiving section 16. FIG. 3A is a timing chart showing the intermittent reception control signal IRC. FIG. 3B is a timing chart showing the reception state of the receiving section 16. FIG. 3C is a timing chart showing the first operation control signal $OC_1$. When the receiving section 16 should be put into a continuous reception state, the control section 20 (FIG. 1) produces the intermittent reception control signal IRC having a logic "L" level as shown in FIG. 3A. When the receiving section 16 should be put into an intermittent reception state, the control section 20 produces the intermittent reception control signal IRC having a logic "H" level as shown in FIG. 3A. After the operation control section 30 receives the intermittent reception control signal IRC having the logic "H" level, the operation control section 30 repeatedly produces the first operation control signal $OC_1$ during the intermittent reception state immediately before the receiving section 16 is put into the reception operation stop state, as shown in FIG. 3C.

Figure 4:
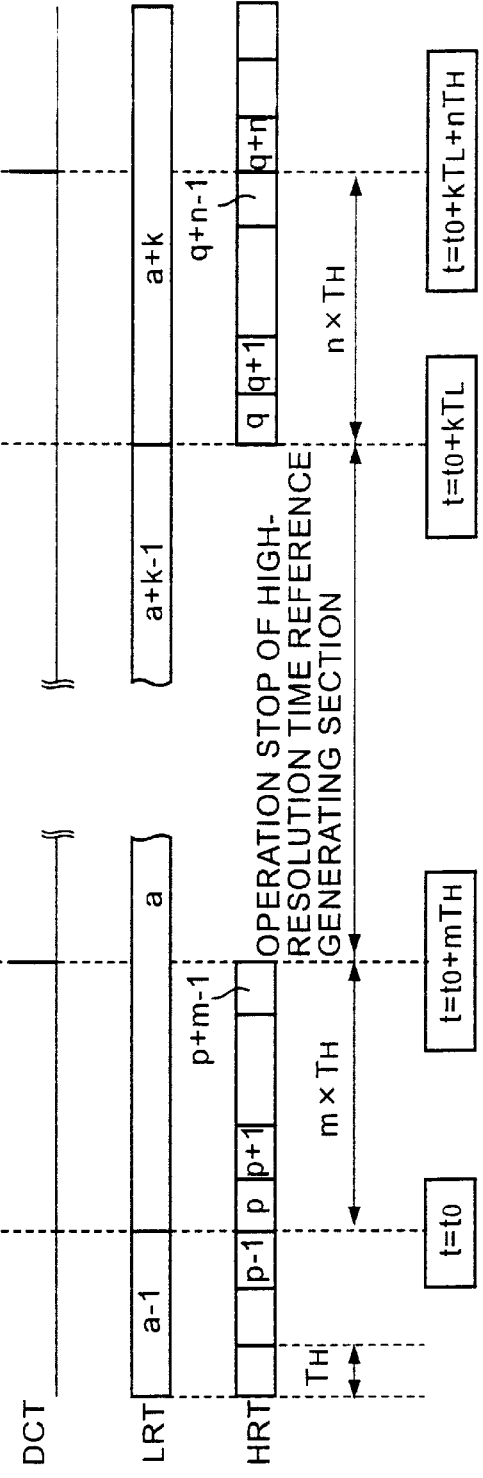
FIGS. 4A through 4F are time charts showing operation timings of each part in the intermittent reception state of the synchronous timing notifying section illustrated in FIG. 2.

Referring to FIGS. 4A through 4F in addition to FIG. 2, the description will be made as regards operation of the synchronous timing notifying section 28 in detail. FIG. 4A is a timing chart for showing a despreading code timing signal DCT produced by the timing control section 40 while FIG. 4B is a timing chart for showing the low-resolution timing signal LRT produced by the low-resolution time reference generating section 32. FIG. 4C is a timing chart for showing the despreading code timing signal DCT produced by the timing control section 40, FIG. 4D is a timing chart for showing the low-resolution timing signal LRT produced by the low-resolution time reference generating section 32, FIG. 4E is a timing chart for showing the high-resolution timing signal HRT produced by the high-resolution time reference generating section 34, and FIG. 4F illustrates time instants.

The operation control section 30 is supplied with the intermittent reception control signal LRC from the control section 20 (FIG. 1). The intermittent reception control signal LRC indicates either an intermittent reception state or a normal or continuous reception state. Responsive to the intermittent reception control signal LRC, the operation control section 30 controls operation states in each components included in the synchronous timing notifying section 28. The "operation state" means a state of an operation start/operation stop (which includes a power source ON/OFF). Specifically, the operation control section 30 controls operations of the phase measurement section 36, the timing generating section 38, the high-resolution time reference generating section 34, and the timing control section 40 by supplying first through fourth operation control signals $OC_1$, $OC_2$, $OC_3$, and $OC_4$ thereto, respectively. More specifically, the operation control section 30 is supplied from the timing generating section 38 with an operation control trigger signal OCT in the manner which will later become clear. When the intermittent reception control signal LRC indicates the intermittent reception state, the operation control section 30 generates the first through the fourth operation control signals $OC_1$ to $OC_4$ by using the operation control trigger signal OCT as a trigger signal for operation start/stop. As being understood from this, in the example being illustrated, the intermittent reception control signal LRC is rather a state control signal and is not a signal where a correct timing is required at real time.

In the example being illustrated, inasmuch as the low-resolution time reference generating section 32 is always put into an operating state or an active state under a condition where the power source for the CDMA terminal is turned on, the low-resolution time reference generating section 32 necessitates no operation control signal from the operation control section 30. Accordingly, no control signal line from the operation control section 30 to the low-resolution time reference generating section 32 is illustrated in FIG. 2. However, operation of the low-resolution time reference generating section 32 is monitored by the control section 20 (FIG. 1) and the operation control section 30.

Figure 5:
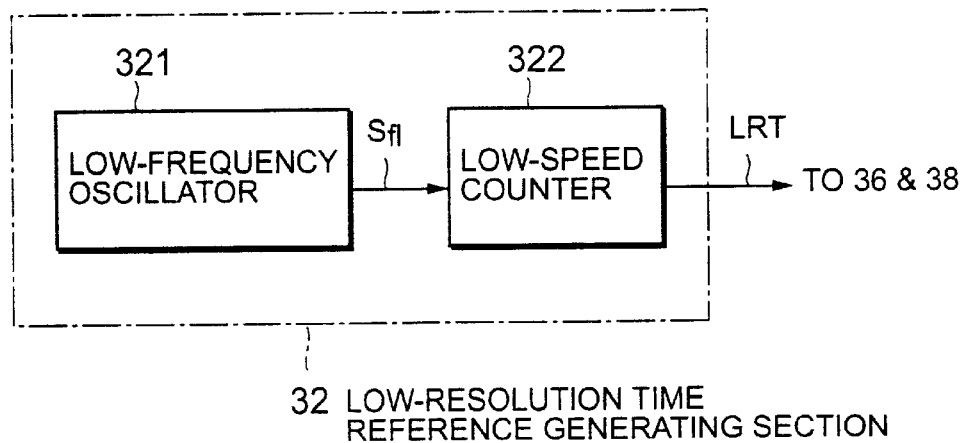
FIG. 5 is a block diagram of a low-resolution time reference generating section for use in the synchronous timing notifying section illustrated in FIG. 2.
Figure 6:
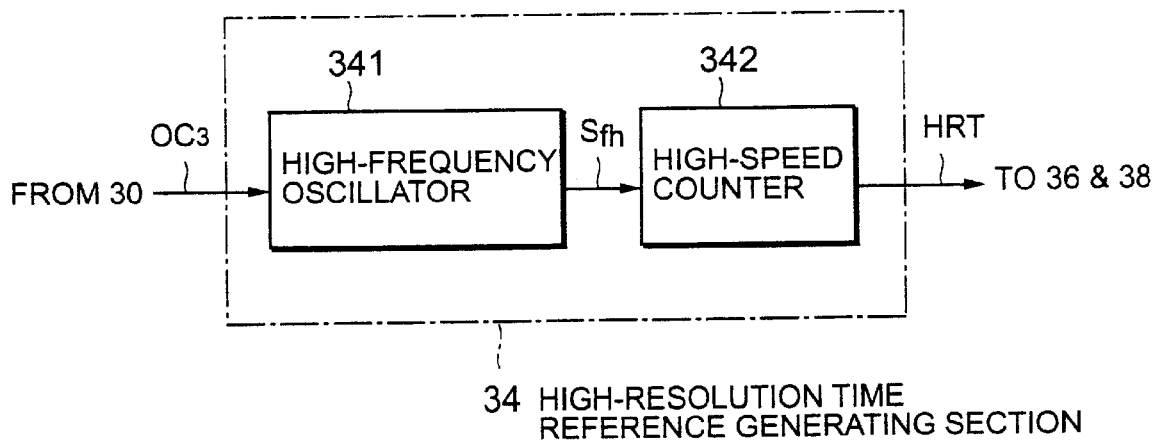
FIG. 6 is a block diagram of a high-resolution time reference generating section for use in the synchronous timing notifying section illustrated in FIG. 2.

Turning to FIGS. 5 and 6, as described above, the low-resolution time reference generating section 32 comprises the low-frequency oscillator depicted at 321 and the low-speed counter depicted at 322 while the high-resolution time reference generating section 34 comprises the high-frequency oscillator depicted at 341 and the high-speed counter depicted at 342.

Specifically, as shown in FIG. 5, the low-resolution time reference generating section 32 comprises the low-frequency oscillator 321 for oscillating the low-frequency signal $S_{fl}$ having a relatively low frequency $f_l$ and the low-speed counter 322 serving as a frequency divider for frequency dividing the low-frequency signal $S_{fl}$ into the divided low-frequency signal as the low-resolution timing signal LRT having the low-resolution period $T_L$ (FIG. 4B) which is relatively long.

In addition, as shown in FIG. 6, the high-resolution time reference generating section 34 comprises the high-frequency oscillator 341 for oscillating the high-frequency signal $S_{fh}$ having a relatively high frequency $f_h$ and the high-speed counter acting as a frequency divider for frequency dividing the high-frequency signal $S_{fh}$ as the divided high-frequency signal as the high-resolution timing signal HRT having the high-resolution period $T_H$ (FIG. 4E) which is relatively short.

The high-resolution period $T_H$ of the high-resolution timing signal HRT is one-i-ths or (1/i) as large as a chip duration Tc, where i represents a first positive integer which is not less than two. For example, the positive integer i may be equal to four. In other words, the chip duration Tc is a multiple of the high-resolution period $T_H$.

The low-resolution period $T_L$ of the low-resolution timing signal LRT is longer than the high-resolution period $T_H$ of the high-resolution timing signal HRT. The low-resolution period $T_L$ may desirably be a multiple of the high-resolution period $T_H$. In other words, the low-resolution period $T_L$ may be j times as large as the high-resolution period TH, where j represents a second positive integer which is not less than two, as illustrated in FIG. 4B.

As exemplifying concrete numerical values, the high-resolution timing signal HRT has a high-resolution frequency of 16.384 MHz which the low-resolution timing signal LRT has a low-resolution frequency of 32 KHz. Accordingly, in the example being illustrated, the low-resolution timing signal LRT has the low-resolution period $T_L$ which is five hundred and twelve times as large as the high-resolution period $T_H$ of the high-resolution timing signal HRT. That is, the second positive integer j obtained by dividing the low-resolution period $T_L$ of the low-resolution timing signal LRT by the high-resolution period $T_H$ of the high-resolution timing signal HRT is equal to a value obtained by raising 2 to the eighth power. Although the second positive integer j is one of powers of 2 in this embodiment, the second positive integer j may be other values.

The phase measurement section 36 is supplied with the despreading code timing signal DCT, the low-resolution timing signal LRT, the high-resolution timing signal HRT, the first operation control signal $OC_1$ from the timing control section 40, the low-resolution time reference generating section 32, the high-resolution time reference generating section 34, and the operation control section 30, respectively. Responsive to the first operation control signal $OC_1$, the phase measurement section 36 measures a phase with respect to the despreading code timing signal DCT on the basis of the low-resolution timing signal LRT and the high-resolution timing signal HRT to produce a phase measurement result signal PMR(n) indicative of a phase measurement result. In the manner which will later become clear, the phase measurement result signal PMR(n) indicates contents corresponding to the phase with respect to the despreading code timing signal DCT on the basis of the low-resolution timing signal LRT and the high-resolution timing signal HRT.

As be understood from that the continuous reception operation is carried out prior to the intermittent reception operation, as a premise, the synchronization between the spread spectrum received signal and the despreading code is established prior to the intermittent reception operation. The timing control section 40 sends the despreading code timing signal DCT indicative of established synchronization information to the phase measurement section 36. The despreading code timing signal DCT has a pulse interval or the chip duration Tc in FIG. 4B. In the manner which will later be described, the despreading code timing signal DCT is a signal indicative of contents which is similar to that of the current synchronous timing signal CST supplied from the synchronous timing generating section 26 (FIG. 1).

Figure 7:
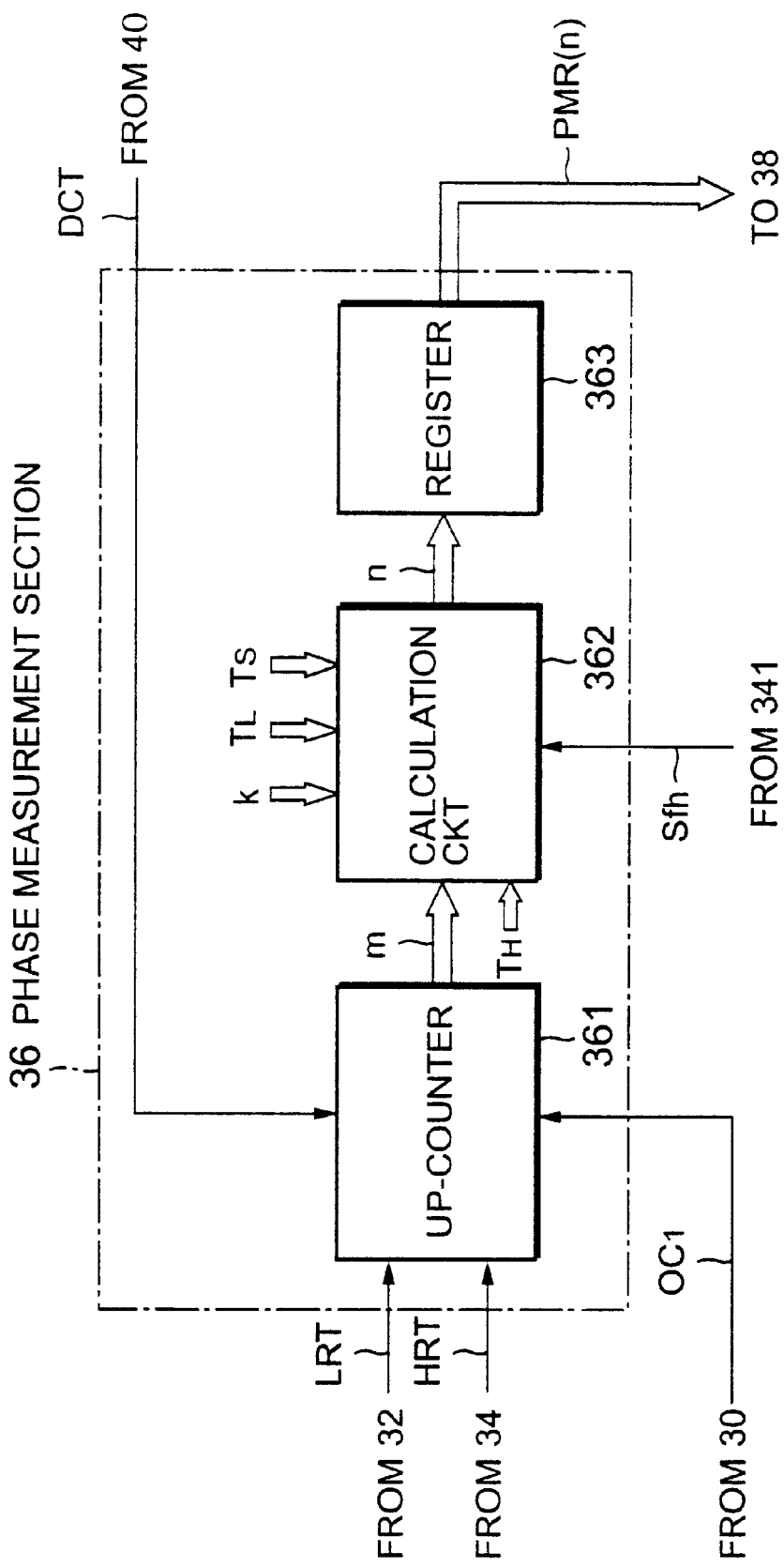
FIG. 7 is a block diagram of a phase measurement section for use in the synchronous timing notifying section illustrated in FIG. 2.

Turning to FIG. 7, the phase measurement section 36 comprises an up-counter 361, a calculation circuit 362, and a register 363. The up-counter 361 is supplied with the first operation control signal $OC_1$, the low-resolution timing signal LRT, the despreading code timing signal DCT, and the high-resolution timing signal HRT. Responsive to the first operation control signal $OC_1$, the up-counter 361 carries out an up-count operation in synchronism with the high-resolution timing signal HRT to produce an up-counted value. In the example being illustrated, after supplied with the first operation control signal $OC_1$, the up-counter 361 starts the up-count operation in response to an edge of the low-resolution timing signal LRT and stops the up-count operation in response to the despreading code timing signal DCT. The up-counted value is depicted at m in FIG. 4E.

For convenience' sake, a time interval obtained by multiplying the up-counted value m by the high-resolution period $T_H$ of the high-resolution timing signal HRT is called a starting difference time interval $mT_H$. As apparent from FIG. 4E, the starting difference time interval $mT_H$ is a time interval between a first time instant $t_0$ and a second time instant $(t_0+mT_H)$ which are indicated in FIG. 4F. The second time instant $(t_0+mT_H)$ is a time instant when the receiving section 16 is put into the reception operation stop state while the first time instant $t_0$ is a time instant at the edge of the low-resolution timing signal LRT immediately before the time instant when the receiving section 16 begins the reception operation stop state.

Before the receiving section 16 is put into the reception operation stop state, the calculation circuit 362 in the phase measurement section 36 is preliminarily provided with a predetermined positive integer k indicating that the reception operation stop time interval Ts corresponds to a multiple of the low-resolution period $T_L$ of the low-resolution timing signal LRT. The predetermined positive integer k is represented by an expression as follows:

k=INT(Ts/$T_L$), where a symbol INT(x) represents an integer part of a value of x. The predetermined positive integer k is a system parameter. The phase measurement section 36 may always hold the predetermined positive integer k. In addition, the phase measurement section 36 may get the predetermined positive integer k from the operation control section 30 or the like as often as necessary. For convenience, sake, a time interval obtained by multiplying the predetermined positive integer k by the low-resolution period $T_L$ of the low-resolution timing signal LRT will be hereinafter called a low-resolution use time interval $kT_L$. As apparent from FIG. 4B, the low-resolution use time interval $kT_L$ is a time interval between the first time instant $t_0$ and a third time interval $(t_0+kT_L)$ which corresponds to an edge of the low-resolution timing signal LRT appearing immediately before a fourth or return time instant $(t_0+kT_L+nT_H)$.

At any rate, the up-counter 361-is operable as a start difference time interval timer for timing, in synchronism with the high-resolution timing signal HRT, the start difference time interval $mT_H$ between the despreading code timing signal DCT and a starting time instant (the first time instant $t_0$) of the low-resolution use time interval $kT_L$ in response to the low-resolution timing signal LRT and the despreading code timing signal DCT.

In the phase measurement section 36, the calculation circuit 362 is provided with the up-counted value m, the predetermined positive integer k, the low-resolution period $T_L$, the high-resolution period $T_H$, the reception operation stop time interval Ts, and the high-frequency signal $S_{fh}$. The calculation circuit 362 calculates, in synchronism with the high-frequency signal $S_{fh}$, a calculated value n which is represented by an expression as follows:

$$n=INT((Ts-kT_L+mT_H)/T_H).$$

That is, the calculated value n is a quotient obtained by dividing a value of (the reception operation stop time interval Ts minus the low-resolution use time interval $kT_L$ plus the starting difference time interval $mT_H$) by the high-resolution period TH of the high-resolution timing signal HRT. The calculated value n is held in the register 363 as a held value. The register 363 produces the held value as the phase measurement result signal PMR (n).

A time interval obtained by multiplying the calculated value n by the high-resolution period TH of the high-resolution timing signal HRT is called a high-resolution compensation time interval $nT_H$ as shown in FIG. 4E.

At any rate, the calculation circuit 362 serves as a calculation circuit for calculating the high-resolution compensation time interval $nT_H$ using the reception operation stop time interval Ts, the starting difference time interval $mT_H$, and the low-resolution use time interval $kT_L$. In addition, the register 363 acts as a register for holding the high-resolution compensation time interval $nT_H$ as a held time interval.

As described above, the phase measurement section 36 measures, in synchronism with the high-resolution timing signal HRT, the stating difference time interval $mT_H$ on the basis of the despreading code timing signal DCT and the low-resolution timing signal LRT. In addition, the phase measurement section 36 calculates the high-resolution compensation time interval $nT_H$ using the reception operation stop time interval Ts, the starting difference time interval $mT_H$, and the low-resolution use time interval $kT_L$. The measurement section 36 produces the phase measurement result signal PMR(n) indicative of the high-resolution compensation time interval $nT_H$.

Figure 8:
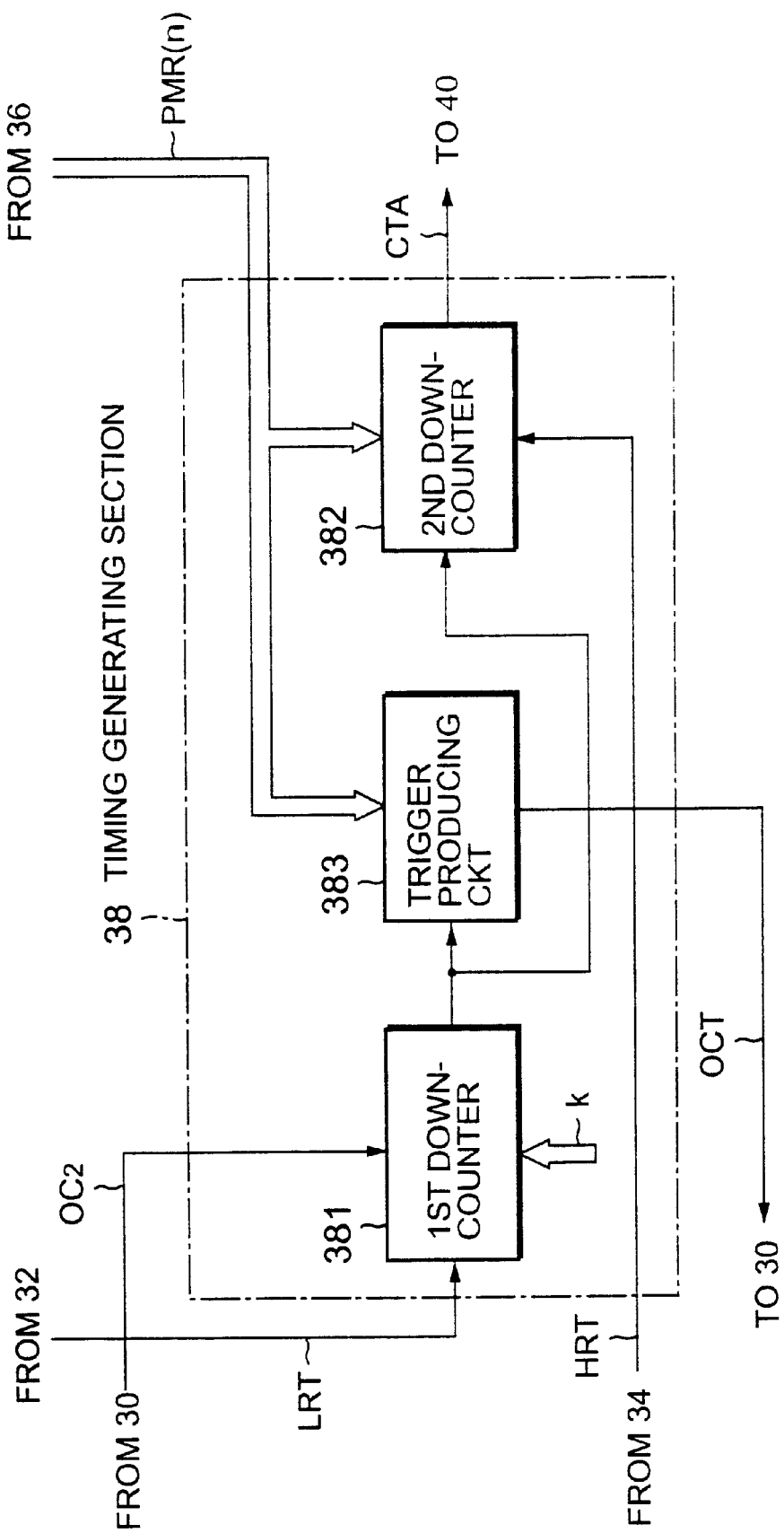
FIG. 8 is a block diagram of a timing generating section for use in the synchronous timing notifying section illustrated in FIG. 2.

Turning to FIG. 8, the timing generating section 38 is supplied with the phase measurement result signal PMR(n), the low-resolution timing signal LRT, the high-resolution timing signal HRT, and the second operation control signal $OC_2$. Responsive to the phase measurement result signal PMR(n) and the second operation control signal $OC_2$, the timing generating section 38 generates the operation control trigger signal OCT and a despreading code timing adjustment signal CTA on the basis of the low-resolution timing signal LRT and the high-resolution timing signal HRT in the manner which become clear as the description proceeds.

The timing generating section 38 comprises first and second down-counters 381 and 382 and a trigger producing circuit 383. The trigger producing circuit 383 is supplied with the phase measurement result signal PMR(n) from the phase measurement section 36. Responsive to the phase measurement result signal PMR (n), the trigger producing circuit 383 produces the operation control trigger signal OCT indicative of an operation stop of the high-resolution time reference generating section 34 that is supplied to the operation control section 30 (FIG. 2). Responsive to the operation control trigger signal OCT indicative of the operation stop of the high-resolution time reference generating section 34, the operation control section 30 produces the second operation control signal $OC_2$ indicative of operation start and the third operation control signal $OC_3$ indicative of operation stop.

The third operation control signal $OC_3$ indicative of the operation stop is supplied to the high-resolution time reference generating section 34 (FIG. 6). Responsive to the third operation control signal $OC_3$ indicative of the operation stop, the high-frequency oscillator 341 is put into an operation stop or inactive state as shown in FIG. 4E.

The second operation control signal $OC_2$ inactive of the operation start is supplied to the first down-counter 381. The first down-counter 381 is provided with the predetermined positive integer k and is supplied with the low-resolution timing signal LRT from the low-resolution time reference generating section 32 (FIG. 2). Responsive to the second operation control signal $OC_2$, the first down-counter 381 carries out, in synchronism with the low-resolution timing signal LRT, a first down-count operation on a first down-counted value from the predetermined positive integer k. When the first down-counted value is equal to zero, the first down-counter 381 produces a first countdown end signal. The first countdown end signal is supplied to the trigger producing circuit 383 and the second down counter 282.

At any rate, the first down-counter 381 is operable as a low-resolution use time interval timer for timing, in synchronism with the low-resolution timing signal LRT, a first elapsed time duration from the starting time instant of the low-resolution use time interval $kT_L$ to produce a first time-out signal when the first elapsed time duration amounts to the low-resolution use time interval $kT_L$.

Responsive to the first countdown end signal, the trigger producing circuit 383 produces the operation control trigger signal OCT indicative of an operation start of the high-resolution time reference generating section 34 that is supplied to the operation control section 30 (FIG. 2). Responsive to the operation control trigger signal OCT indicative of the operation start of the high-resolution time reference generating section 34, the operation control section 30 produces the third operation control signal $OC_3$ indicative of an operation restart which is supplied to the high-resolution time reference generating section 34. Responsive to the third operation control signal $OC_3$ indicative of the operation restart, the high-frequency oscillator 341 restarts or is put into an operation start or active state as shown in FIG. 4E. Accordingly, the high-resolution time reference generating section 34 regenerates the high-resolution timing signal HRT which is supplied to the phase measurement section 36 and the timing generating section 38.

In the timing generating section 38, the high-resolution timing signal HRT is supplied to the second down-counter 382. The second down-counter 382 is supplied with the phase measurement result signal PMR(n) indicative of the calculated value n from the phase measurement section 36. Responsive to the first countdown end signal, the second down-counter 382 carries out, in synchronism with the high-resolution timing signal HRT, a second down-count operation on a second down-counted value from the calculated value n. When the second counted value is equal to zero, the second down-counter 382 produces a second countdown end signal as the despreading code timing adjustment signal CTA which is supplied to the timing control section 40 (FIG. 2).

At any rate, the second down-counter 382 serves as a high-resolution compensation time interval timer for timing, in synchronism with the high-resolution timing signal HRT, a second elapsed time duration from an expiry time instant $(t_0+kT_L)$ of the low-resolution use time interval $kT_L$ to produce a second time-out signal as the despreading code timing adjustment signal CTA when the second elapsed time duration amounts to the high-resolution compensation time interval $nT_H$.

As described above, responsive to the phase measurement result signal PMR(n), the timing generating section 38 counts timing for production of the operation control trigger signal OCT and the despreading code timing adjustment signal CTA on the basis of the low-resolution timing signal LRT and the high-resolution timing signal HRT. The timing generating section 38 supplies the operation control section 30 and the timing control section 40 with the operation control trigger signal OCT and the despreading code timing adjustment signal CTA, respectively.

Turning back to FIG. 2, the timing control section 40 is supplied with the current synchronous timing signal CST from the synchronous timing generating section 26 (FIG. 1). Responsive to the current synchronous timing signal CST, the timing control section 40 supplies the despreading code timing signal DCT to the phase measurement section 36. In addition, the timing control section 40 is supplied with the fourth operation control signal $OC_4$ from the operation control section 30. Responsive to the fourth operation control signal $OC_4$, the timing control section 40 is put into a normal operation state from the reception operation stop state. Under the circumstances, the timing control section 40 produces the synchronous timing notification signal STN on the basis of the despreading code timing adjustment signal CTA supplied from the timing generating section 38. The synchronous timing notification signal STN is supplied to the synchronous timing generating section 26 (FIG. 1).

The synchronous timing notification signal STN is a signal for adjusting a timing of the despreading code. Responsive to the synchronous timing notification signal STN, the synchronous timing generating section 26 operates so as to generate the current synchronous timing signal CST at a timing of the fourth time instant $(t_0+kT_L+nT_H)$ as shown in FIG. 4F. That is, in this case, the synchronous timing generating section 26 can generate a correct synchronous timing signal using the synchronous timing notification STN in lieu of the initial synchronous acquisition signal ISA obtained by the initial synchronous acquisition in the synchronous acquisition section 24 without carrying out the initial synchronous acquisition.

At any rate, a combination of the operation control section 30, the phase measurement section 36, the timing generating section 38, and the timing control section 40 serves as a state control section (30, 36, 38, 40) which is connected to the high-resolution time reference generating section 34. The state control section (30, 36, 38, 40) puts, for substantially the operation stop time interval Ts, the CDMA receiver 16 into the cold standby state where the high-resolution time reference generating section 34 does not operate while the low-resolution time reference generating section 32 operates. On or immediately before the reception return time instant $(t_0+kT_L+nT_H)$, the state control section (30, 36, 38, 40) puts the CDMA receiver 16 into the hot standby state where the high-resolution time reference generating section 34 operates.

In addition, a combination of the phase measurement section 36 and the timing generating section 38 acts as a time interval measuring section (36, 38) which is connected to the high-resolution time reference generating section 34 and the low-resolution time reference generating section 32. The time interval measuring section (36, 38) measures the reception operation stop time interval Ts by using the combination of the multiple of the low-resolution period TL and the multiple of the high-resolution period TH to produce the operation control trigger signal OCT and the despreading code timing adjustment signal CTA. More specifically, the time interval measuring section (36, 38) measures, in synchronism with the high-resolution timing signal HRT, the starting difference time interval $mT_H$ between the reception stop stating time instant $(t_0+mT_H)$ and a starting time instant to of the low-resolution use time interval $kT_L$. Subsequently, the time interval measuring section (36, 38) calculates the high-resolution compensation time interval $nT_H$ on the basis of the reception operation stop time interval Ts, the starting difference time interval $mT_H$, and the low-resolution use interval $kT_L$. The time interval measuring section (36, 38) produces the operation control trigger signal OCT indicative of operation stop of the high-resolution time reference generating section 34 at a time when the CDMA receiver 16 is put into the cold standby state. The time interval measuring section (36, 38) produces the operation control trigger signal OCT indicative of operation start of the high-resolution time reference generating section 34 at a time when the CDMA receiver 16 is put into the hot standby state.

Responsive to the operation control trigger signal OCT, the operation control section 30 controls the operation of the high-resolution time reference generating section 34. Specifically, response to the operation control trigger signal OCT indicative of the operation stop of the high-resolution time reference generating section 34, the operation control section 30 makes the high-resolution time reference generating section stop operation thereof. Responsive to the operation control trigger signal OCT indicative of the operation start of the high-resolution time reference generating section 34, the operation control section 30 makes the high-resolution time reference generating section 34 restart operation thereof.

Furthermore, the timing control section 40 is operable as a notification signal producing section which is connected to the time interval measuring section (36, 38) and the synchronous timing generating section 26. Responsive to the despreading code timing adjustment signal CTA, the notification signal producing section 40 notifies the synchronous timing generating section 26 of the synchronous timing notification signal STN.

In this event, the state control section (30, 36, 38, 40) generates the synchronous timing notification signal STN by counting the low-resolution timing signal LRT and the high-resolution timing signal HRT so that the combination of the multiple of the low-resolution period $T_L$ and the multiple of the high-resolution period $T_H$ substantially coincides with the reception operation stop time interval Ts.

Operation will proceed to operation of the synchronous timing notifying section 28. It will be, as a premise of the intermittent reception operation, assumed that the low-resolution period $T_L$ Of the low-resolution timing signal LRT, the high-resolution period $T_H$ of the high-resolution timing signal HRT, the reception operation stop time interval Ts, and the predetermined positive integer k are held in or provided with the components which should be obtain those as described above.

Under the circumstances, when the operation control section 30 is supplied with the intermittent reception control signal IRC indicative of the intermittent reception state, the operation control section 30 supplies the phase measurement section 36, the timing generating section 38, the high-resolution time reference generating section 34, and the timing control section 40 with the first through the fourth operation control signals $OC_1$ to $OC_4$, respectively, in the manner as described above.

Responsive to the first operation control signal OC1, the phase measurement section 36 measures a time difference between the despreading code timing signal DCT and the edge of the low-resolution timing signal LRT using the high-resolution timing signal HRT. Specifically, the up-counter 361 of the phase measurement section 36 carries out, in synchronism with the high-resolution timing signal HRT, up-count operation on the up-counted value m which corresponds to the starting difference time interval $mT_H$ as shown in FIG. 4E. In addition, the phase measurement section 36 is provided with the predetermined positive integer k ($=INT (Ts/T_L$ ) indicating that the reception operation stop time interval Ts corresponds to a multiple of the low-resolution period $T_L$ of the low-resolution timing signal LRT. In this event, the calculating circuit 362 calculates the calculated value n ($=INT((Ts-kT_L+mT_H)/T_H)$ which corresponds to the high-resolution compensation time interval $nT_H$. The register 363 holds the calculated value n as the held value. The phase measurement section 36 supplies the timing generating section 38 with the phase measurement result signal PMR(n) indicative of the calculated value n.

The timing generating section 38 calculates, in response to the phase measurement result signal PMR(n), the return time instant $(t_0+kT_L)$ as shown in FIG. 4E by counting the low-resolution timing signal LRT. At the return time instant $(t_0+kT_L)$, the timing generating section 38 supplies the operation control section 30 with the operation control trigger signal OCT indicative of the operation start of high-resolution time reference generating section 34. The return time instant $(t_0+kT_L)$ is a time instant obtaining by subtracting the high-resolution compensation time interval $nT_H$ from the next receiving timing. In other words, the return time instant $(t_0+kT_L)$ is a time instant at which a difference time interval between the low-resolution use time interval $kT_L$ and the starting difference time interval $mT_H$ elapsed while the receiving section 16 is put into the reception operation stop state.

Responsive to the operation control trigger signal OCT indicative of the reception start from the timing generating section 38, the operation control section 30 supplies the high-resolution time reference generating section 34 with the third operation control signal $OC_3$ indicative of the start to that the high-resolution time reference generating section 34 starts its operation at the return time instant $(t_0+kT_L)$ as shown in FIG. 4F.

When the high-resolution time reference generating section 34 is put into the operating or the active state again, the timing generating section 38 measures or counts the high-resolution compensation time interval $nT_H$ in synchronism with the high-resolution timing signal HRT supplied from the high-resolution time reference generating section 34 to correct the timing of the despreading code. Accordingly, inasmuch as the high-resolution compensation time interval $nT_H$ in the fourth time instant or the reception operation start timing $(t_0+kT_L+nT_H)$ is measured in the timing generating section 38, it is possible for the synchronous timing notifying section 28 to notify the synchronous timing generating section 26 of the correct synchronous timing.

As described above, in the CDMA terminal according to the first embodiment of this invention, it is possible to stop the operation of the high-resolution time reference generating section 34 for a time duration obtained by subtracting a maximum of a time interval ($Tc+T_L$) corresponding to the chip duration Tc plus the low-resolution time interval $T_L$ from the reception operation stop time interval Ts of the receiving section 16. That is, it is possible for the CDMA terminal according to the first embodiment of this invention to realize a low consumption of current on the intermittent reception operation in comparison with the conventional CDMA terminal which cannot stop operation of the high-resolution time reference generating section 34.

In addition, it will be assumed that the low-resolution period $T_L$ of the low-resolution timing signal LRT is selected so as to satisfy a relationship among the reception operation stop time interval Ts, the chip duration Tc, the predetermined positive integer k, and the low-resolution period $T_L$ as follow:

$$(Ts-Tc)<kT_L \leq Ts.$$

In this event, it is possible to stop the operation of the high-resolution time reference generating section 34 for a time duration obtained by subtracting a maximum of a time interval 2Tc corresponding to twice the chip duration Tc from the reception operation stop time interval Ts of the receiving section 16.

In addition, inasmuch as it is difficult to maintain a phase relationship between the low-resolution timing signal LRT generated by the low-resolution time reference generating section 32 and the high-resolution timing signal HRT generated by the high-resolution time reference generating section 34 whose operation restarts after the operation of the high-resolution time reference generating section 34 stops once, uncertainty of a part corresponding to ± one high-resolution period $T_H$ of the high-resolution timing signal HRT occurs in the receiving section 16. However, it is possible to avoid such uncertainty by setting resolution of the high-resolution timing signal HRT high. In addition, in a case where the synchronous timing notifying section 28 is actually built into the CDMA terminal, the demodulating section 22 may simultaneously carry out the despreading operation at timings before and after a synchronization point frequently in order to compensate path fluctuation between transmission and reception naturally. Accordingly, the above-mentioned uncertainty is substantially not a problem.

Figure 9:
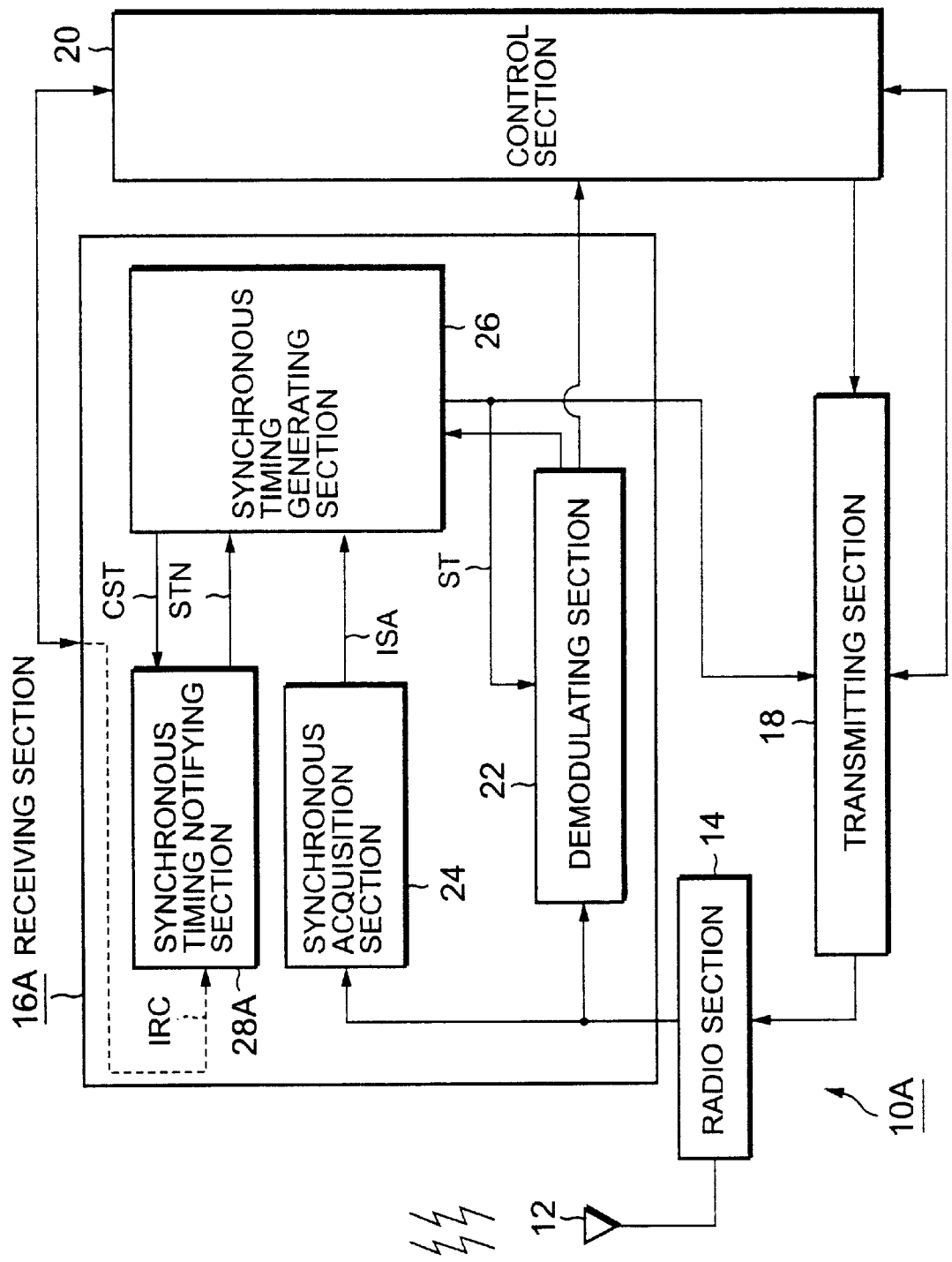
FIG. 9 is a block diagram of a CDMA terminal according to a second embodiment of this invention.

Referring to FIG. 9, the description will proceed to a CDMA terminal 10A according to a second embodiment of this invention. The illustrated CDMA terminal 10A is similar in structure and operation to that illustrated in FIG. 1 except that the receiving section is modified from that illustrated in FIG. 1 as will later become clear. The receiving section is therefore depicted at 16A.

The receiving section 16A is similar in structure and operation to that illustrated in FIG. 1 except that the synchronous timing notifying section is modified from that illustrated in FIG. 1 as will later become clear. The synchronous timing notifying section is therefore depicted at 28A.

Figure 10:
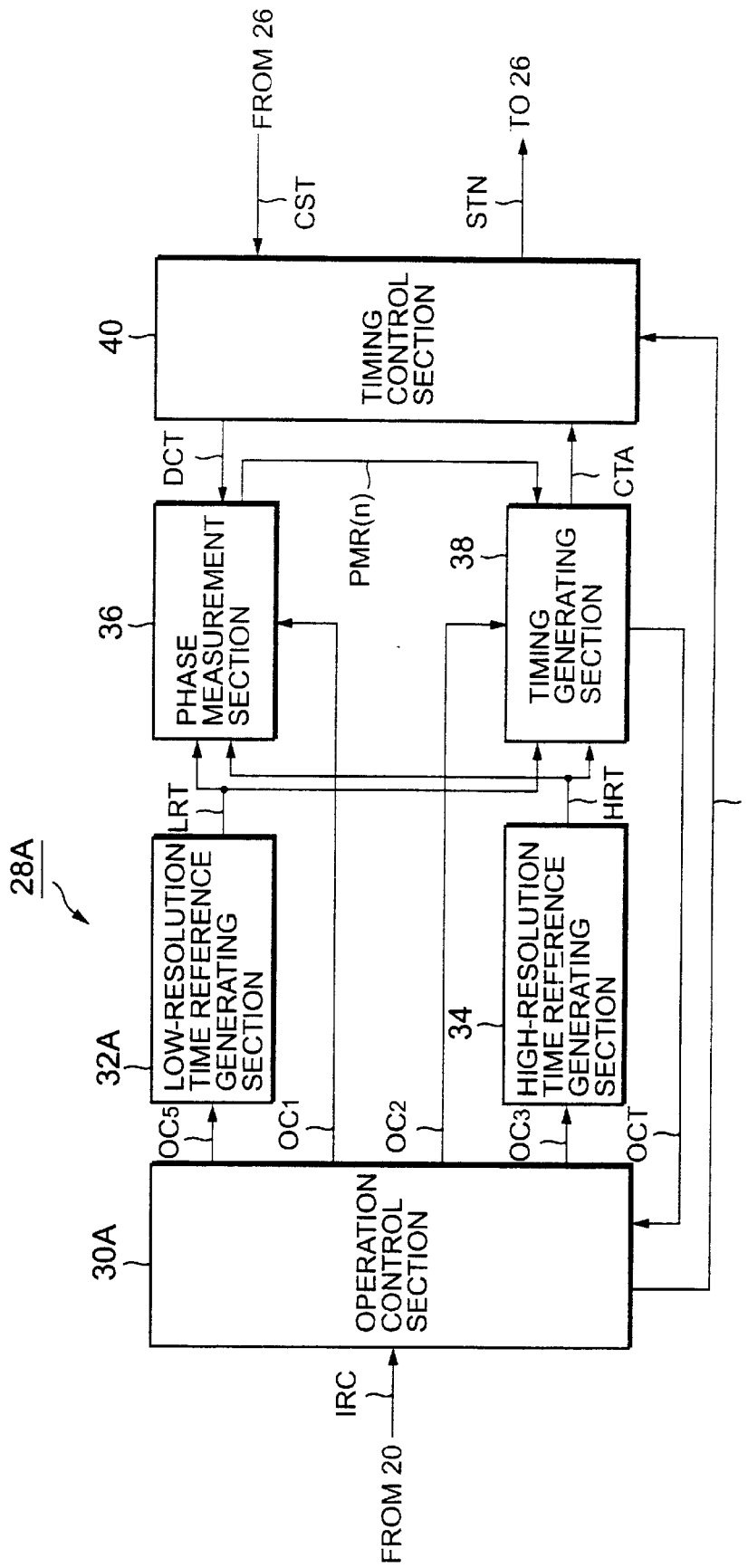
FIG. 10 is a block diagram of a synchronous timing notifying section for use in the CDMA terminal illustrated in FIG. 9.

Turning to FIG. 10, the description will proceed to the synchronous timing notifying section 28A illustrated in FIG. 9. The synchronous timing notifying section 28A is similar in structure and operation to that illustrated in FIG. 2 except that the operation control section and the low-resolution time reference generating section are modified from those illustrated in FIG. 2 as will later become clear. The operation control section and the low-resolution time reference generating section are therefore depicted at 30A and 32A, respectively.

The operation control section 30A produces riot only the first through the fourth operation control signals $OC_1$ to $OC_4$ but also a fifth operation control signal $OC_5$ for controlling operation of the low-resolution time reference generating section 32A. The fifth operation control signal $OC_5$ is supplied to the low-resolution time reference generating section 32A.

Figure 11:
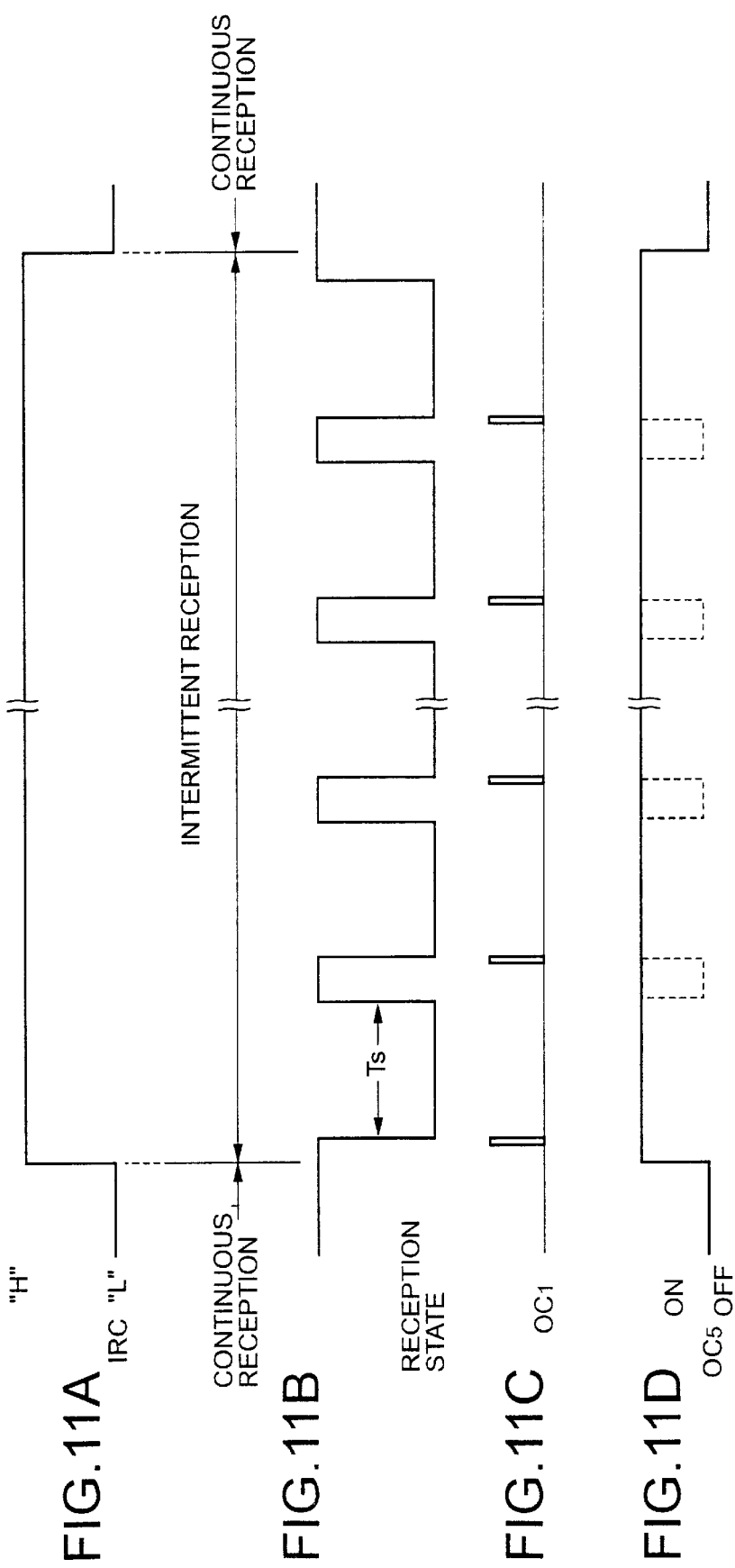
FIGS. 11A through 11D are time charts for use in describing operation in an intermittent reception state of the CDMA terminal illustrated in FIG. 9.

As illustrated in a sold line of FIG. 11D, the fifth operation control signal $OC_5$ indicates an operation or active state when the receiving section 16A is put into the intermittent reception state. The fifth operation control signal $OC_5$ indicates an operation stop or inactive state when the receiving section 16A is put into the continuous reception state.

Figure 12:
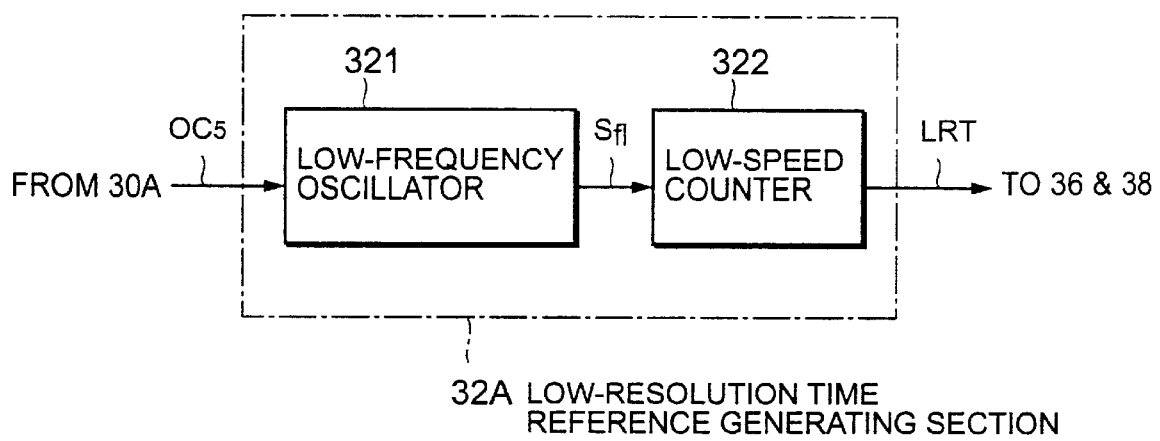
FIG. 12 is a block diagram of a low-resolution time reference generating section for use in the synchronous timing notifying section illustrated in FIG. 10.

Turning to FIG. 12, the low-resolution time reference generating section 32A comprises the low-frequency oscillator 321 and the low-speed counter 322 in the similar manner in the low-reference time reference generating section 32 illustrated in FIG. 5. But, operation of the low-frequency oscillator 321 is controlled by the fifth operation control signal $OC_5$. Accordingly, the synchronous timing notifying section 28A can stop the operation of the low-resolution time reference generating section 32A while the receiving section 16A does not carry out the intermittent reception operation or when the synchronous timing notifying section 28A does not carry out time measurement operation using the low-resolution time reference generating section 32A.

In the example being illustrated, the low-resolution time reference generating section 32A may operate for a time duration which including a part corresponding to the cold standby state and portions before and after the part, as illustrated in broken lines of FIG. 11D. This is because the high-resolution time reference generating section 34 may operate for a time duration except for the part corresponding to the cold standby state.

As described above, in the second embodiment of this invention, it is possible to stop operation of the low-resolution time reference generating section 32A under the control of the fifth operation control signal $OC_5$. Accordingly, a consumed current is further reduced a little in comparison with a case of the first embodiment of this invention.

Figure 13:
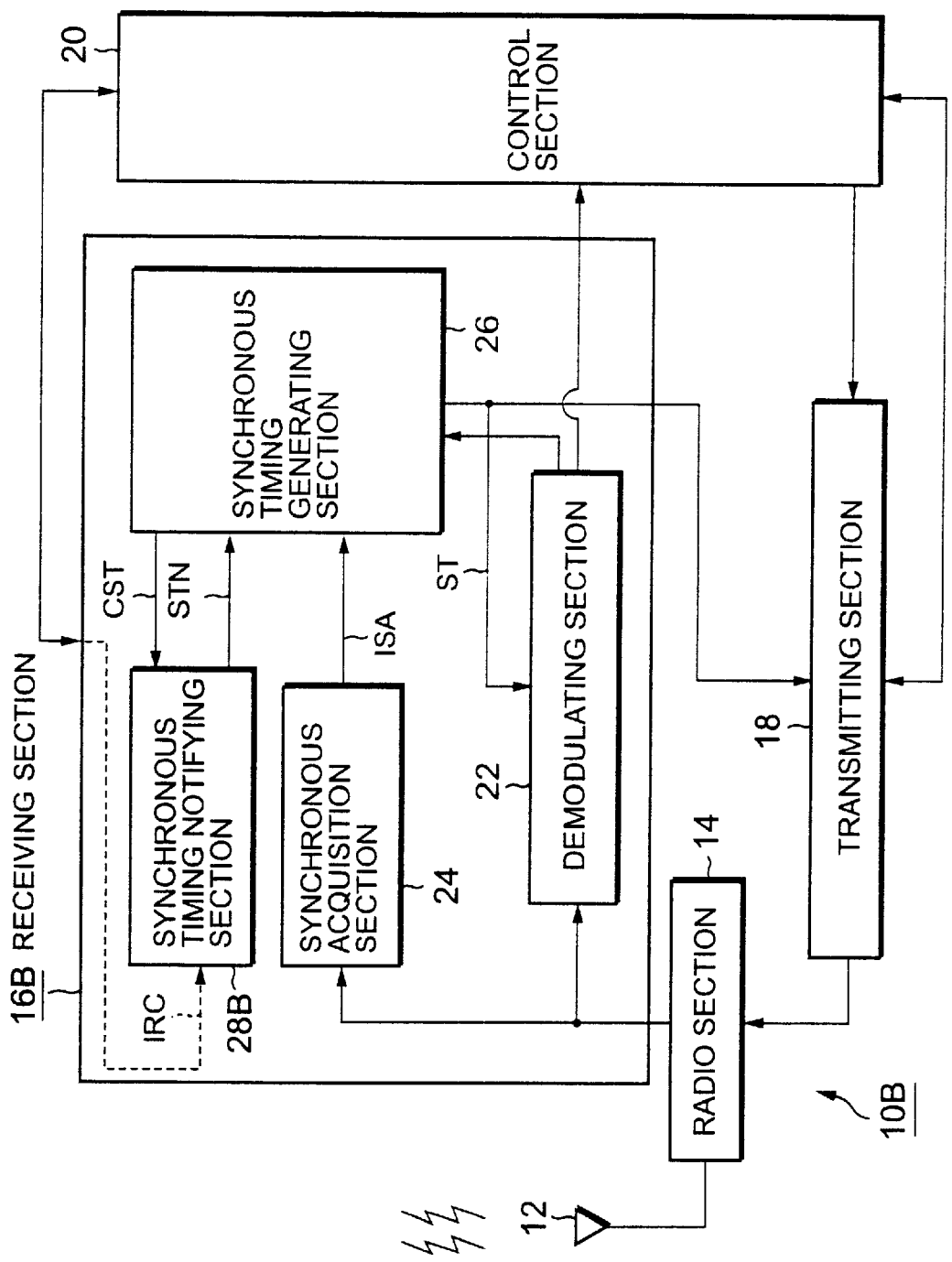
FIG. 13 is a block diagram of a CDMA terminal according to a third embodiment of this invention.

Referring to FIG. 13, the description will proceed to a CDMA terminal 10B according to a third embodiment of this invention. The illustrated CDMA terminal 10B is similar in structure and operation to that illustrated in FIG. 9 except that the receiving section is modified from that illustrated in FIG. 9 as will later become clear. The receiving section is therefore depicted at 16B.

The receiving section 16B is similar in structure and operation to that illustrated in FIG. 9 except that the synchronous timing notifying section is modified from that illustrated in FIG. 9 as will later become clear. The synchronous timing notifying section is therefore depicted at 28B.

Figure 14:
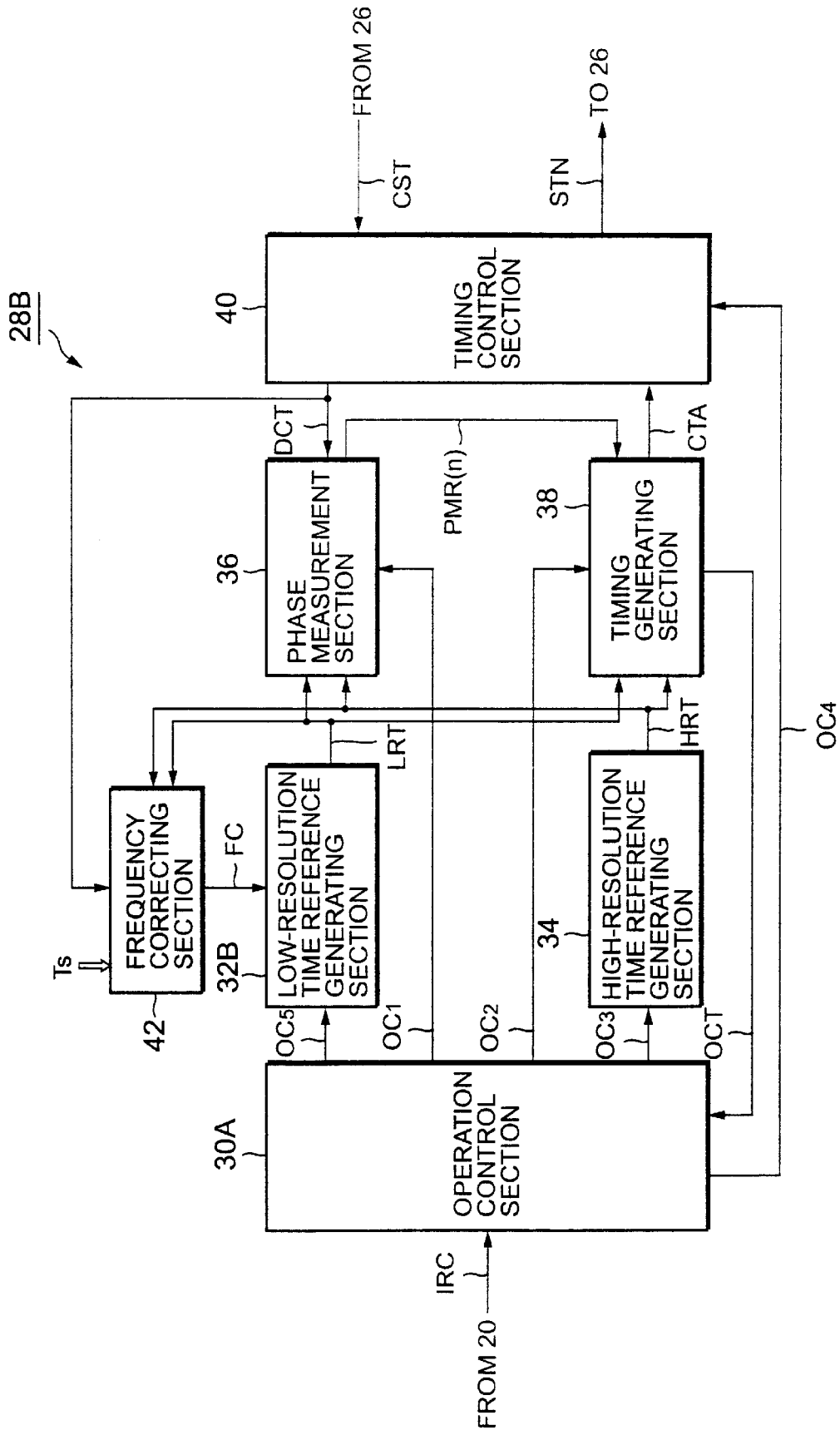
FIG. 14 is a block diagram of a synchronous timing notifying section for use in the CDMA terminal illustrated in FIG. 13.

Turning to FIG. 14, the description will proceed to the synchronous timing notifying section 28B illustrated in FIG. 13. The synchronous timing notifying section 28B is similar in structure and operation to that illustrated in FIG. 10 except that the synchronous timing notifying section 28B further comprises a frequency correcting section 42 and the low-resolution time reference generating section is modified from that illustrated in FIG. 10 as will later become clear. The low-resolution time reference generating section is therefore depicted at 32B.

The frequency correcting section 42 is supplied with the low-resolution timing signal LRT, the high-resolution timing signal HRT, and the despreading code timing signal DCT from the low-resolution time reference generating section 32B, the high-resolution time reference generating section 34, and the timing control section 40. In addition, the frequency correcting section 42 is provided with the reception operation stop time interval Ts. Responsive to the despreading code timing signal DCT, the frequency correcting section 42 corrects a frequency of the low-resolution timing signal LRT having a relatively low absolute precision using the high-resolution timing signal HRT having a relatively high absolute precision to hold a frequency corrected state. That is, the frequency correcting section 42 corrects the frequency of the low-resolution timing signal LRT so that the reception operation stop time interval Ts is a multiple of the low-resolution period $T_L$. In other words, the frequency correcting section 42 corrects the frequency of the low-resolution timing signal LRT so that the starting difference time interval $mT_H$ is substantially equal to the high-resolution compensation time interval $nT_H$. The frequency correcting section 42 supplies the low-frequency time reference generating section 32 with a frequency correction signal FC indicative of the frequency corrected state.

Figure 15:
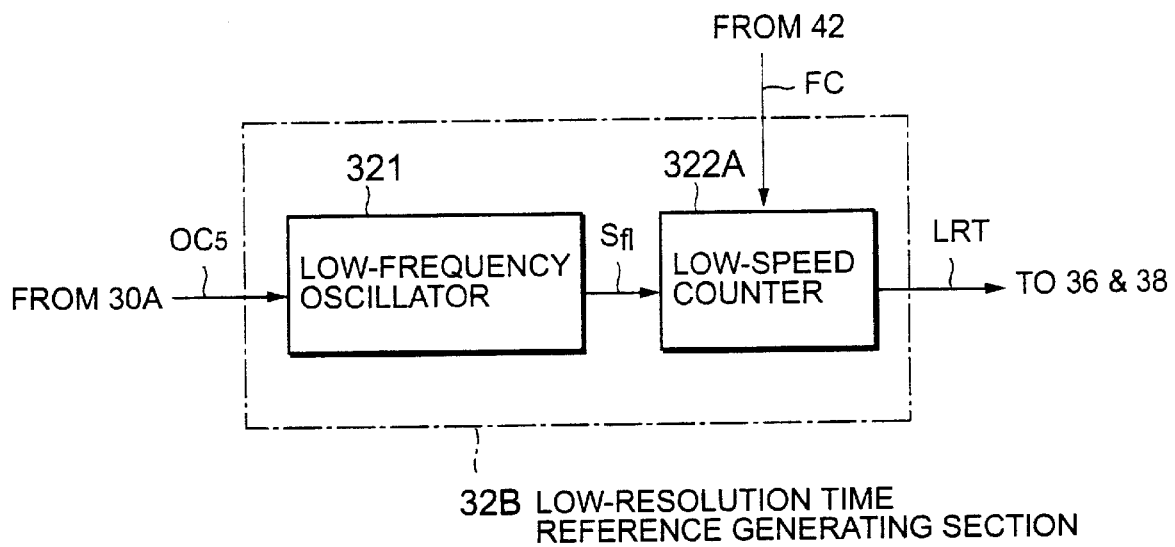
FIG. 15 is a block diagram of a low-resolution time reference generating section for use in the synchronous timing notifying section illustrated in FIG. 14.

Turning to FIG. 15, the low-resolution time reference generating section 32B is similar in structure and operation to the low-resolution time reference generating section 32A illustrated in FIG. 12 except that the low-speed counter is modified from those illustrated in FIG. 12 as will later become clear. The low-speed counter is therefore depicted at 322A.

The low-speed counter 322A is supplied with the frequency correction signal FC from the frequency correction section 42 (FIG. 14). Responsive to the frequency correction signal FC, the low-speed counter 322A corrects the frequency of the low-resolution timing signal LRT in the manner known in the art. As a result, it is possible to make the low-resolution period $T_L$ of the low-resolution timing signal LRT equal to an integer multiple of the chip duration Tc of the despreading code timing signal DCT.

With this structure, a phase relationship between the low-resolution timing signal LRT and the despreading code timing signal DCT is constant. Accordingly, it is possible to use the starting difference time interval $mT_H$, which is equal to a phase difference between the low-resolution timing signal LRT and the despreading code timing signal DCT that measured before making the operation of the high-resolution time reference generating section 34 stop, as the high-resolution compensation time interval $nT_H$ after restating the operation of the high-resolution time reference generating section 34. This means that it is possible to make the starting difference time interval $mT_H$ equal to the high-resolution compensation time interval $nT_H$, namely, n=m.

In this event, it is possible to stop the operation of the high-resolution time reference generating section 34 for a time duration corresponding to the reception operation stop time interval Ts but the chip duration Tc of the despreading code timing signal DCT. As a result, it is possible to further reduce a consumed current in comparison with a case of the first and the second embodiments of this invention. This is because it is possible to stop the operation of the high-resolution time reference generating section 34 for a longer time interval than those of the first and the second embodiments of this invention. Inasmuch as the starting difference time interval $mT_H$ is equal to the high-resolution compensation time interval $nT_H$, the calculation circuit 362 (FIG. 7) may be omitted from the phase measurement section 36.

In addition, the frequency correcting section 42 may correct not only the frequency of the low-resolution timing signal LRT but also a phase of the low-resolution timing signal LRT so as to match the phase of the low-resolution timing signal LRT with a phase of the despreading code timing signal DCT. Under the circumstances, it is possible for the synchronous timing notifying section 28B to ideally make both of the starting difference time interval $mT_H$ and the high-resolution compensation time interval $nT_H$ substantially equal to zero. It is therefore possible for the synchronous timing notifying section 28B to make a cold standby time interval in the high-resolution time reference generating section 34 equal to the reception operation stop time interval Ts of the receiving section 16B. As a result, a further reduction of the consumed current may be expected in the intermittent reception in comparison with a case of the first and the second embodiments of this invention. Inasmuch as both of the starting difference time interval $mT_H$ and the high-resolution compensation time interval $nT_H$ are substantially equal to zero, the up-counter 361 (FIG. 7) and the calculating circuit 362 (FIG. 7) may be omitted from the phase measurement section 36 and the second down-counter 382 (FIG. 8) may be omitted from the timing generating section 38.

Figure 16:
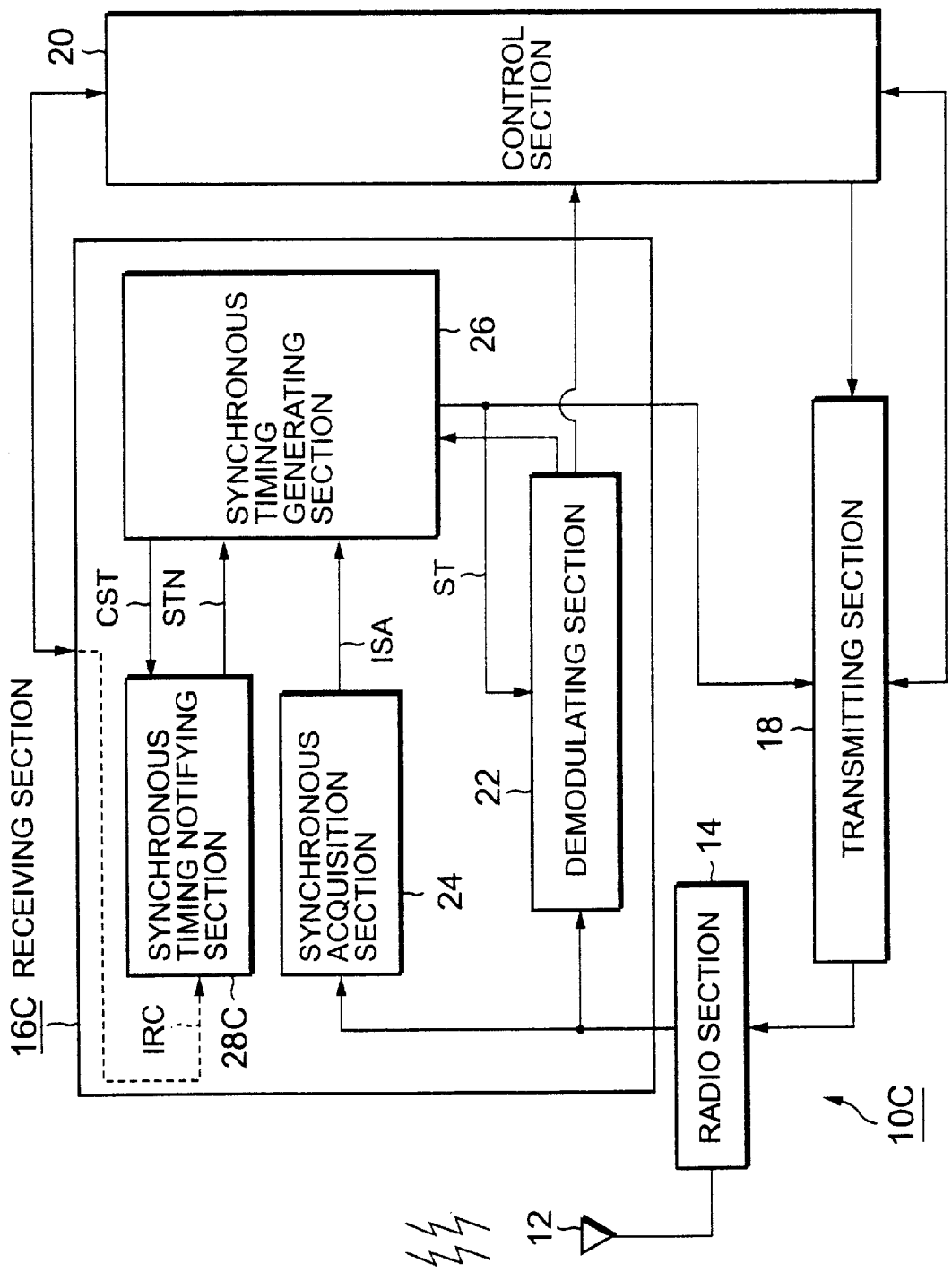
FIG. 16 is a block diagram of a CDMA terminal according to a fourth embodiment of this invention.

Referring to FIG. 16, the description will proceed to a CDMA terminal 10C according to a fourth embodiment of this invention. The illustrated CDMA terminal 10C is similar in structure and operation to that illustrated in FIG. 1 except that the receiving section is modified from that illustrated in FIG. 1 as will later become clear. The receiving section is therefore depicted at 16C.

The receiving section 16C is similar in structure and operation to that illustrated in FIG. 1 except that the synchronous timing notifying section is modified from that illustrated in FIG. 1 as will later become clear. The synchronous timing notifying section is therefore depicted at 28C.

Figure 17:
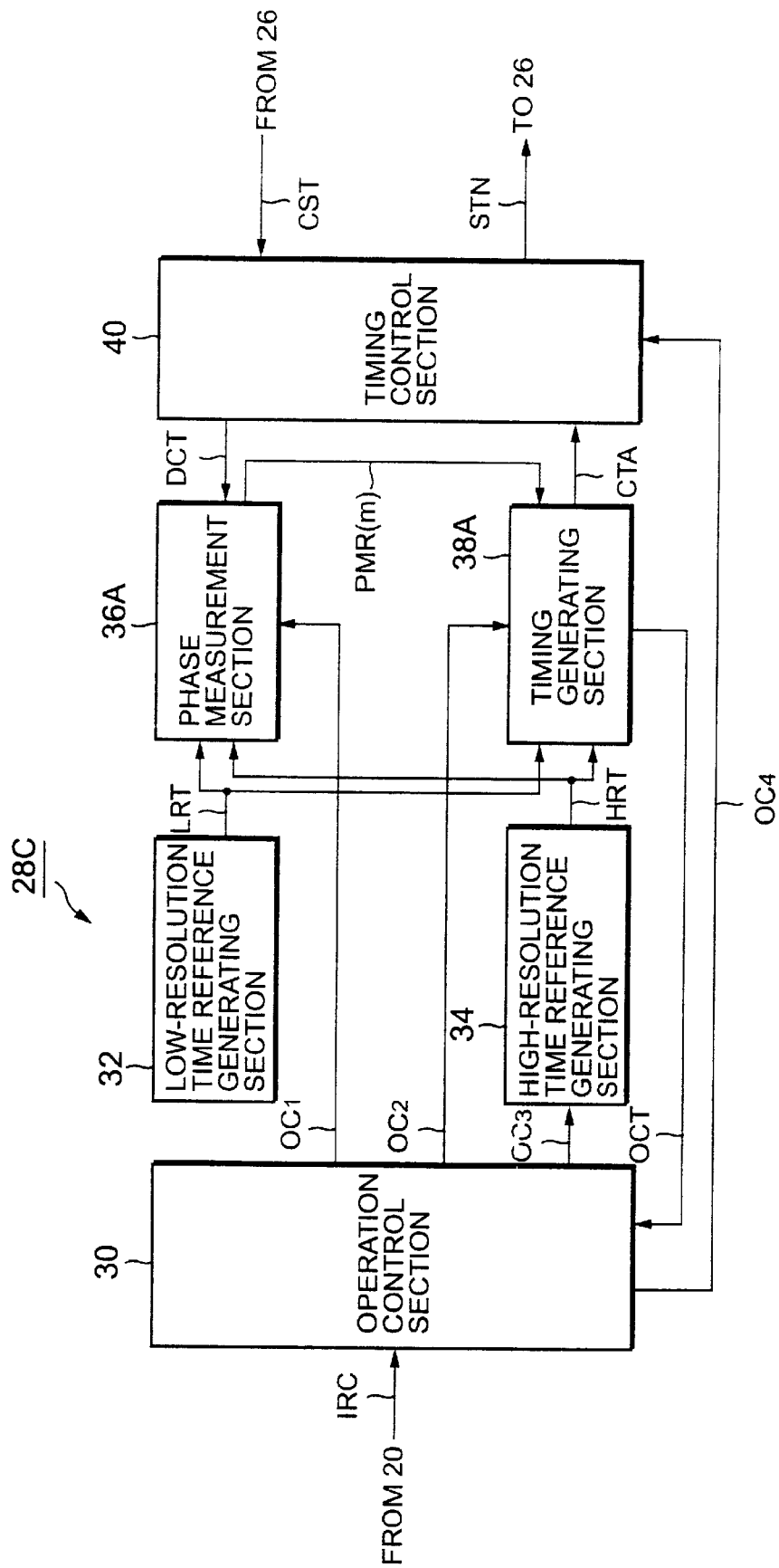
FIG. 17 is a block diagram of a synchronous timing notifying section for use in the CDMA terminal illustrated in FIG. 16.

Turning to FIG. 17, the description will proceed to the synchronous timing notifying section 28C illustrated in FIG. 16. The synchronous timing notifying section 28C is similar in structure and operation to that illustrated in FIG. 2 except that the phase measurement section and the timing generating section are modified from those illustrated in FIG. 2 as will later become clear. The phase measurement section and the timing generating section are therefore depicted at 36A and 38A, respectively.

Figure 18:
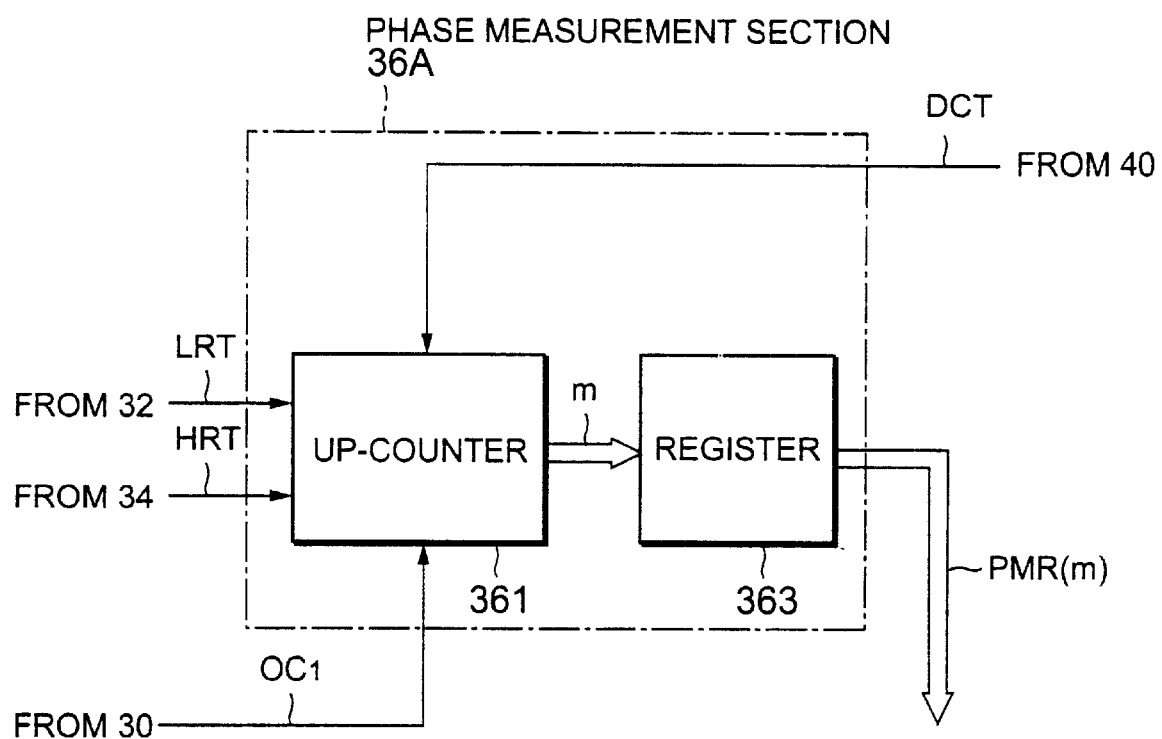
FIG. 18 is a block diagram of a phase measurement section for use in the synchronous timing notifying section illustrated in FIG. 17.

Turning to FIG. 18, the phase measurement section 36A comprises only the up-counter 361 and the register 363. In the similar manner as described in conjunction with FIG. 7, the up-counter 361 produces the up-counted value indicative of m. The up-counter 361 is directly connected to the register 363. The register 363 holds the up-counted value m as the held value to produce the phase measurement result signal PMR(m) indicative of the held value m. At any rate, the phase measurement section 36A measures or counts the starting difference time interval $mT_H$ using the high-resolution timing signal HRT as a clock signal. The phase measurement result signal PMR(m) is supplied to the timing generating section 38A.

At any rate, the phase measurement section 36A measures, in synchronism with the high-resolution timing signal HRT, the starting difference time interval $mT_H$ on the basis of the despreading code timing signal DCT and the low-resolution timing signal LRT to produce the phase measurement result signal PMR(m) indicative of the starting difference time interval $mT_H$. In addition, the up-counter 361 serves as a starting difference time interval timer for timing, in synchronism with the high-resolution timing signal, the starting difference time interval $mT_H$ between the dispreading code timing signal DCT and the starting time instant $t_0$ of the low-resolution use time interval $kT_L$ in response to the low-resolution timing signal LRT and the despreading code timing signal DCT. Furthermore, the register 363 acts as a first register for holding the starting difference time interval $mT_H$ as a first held time interval to produce the phase measurement result signal PMR(m) indicative of the first held time interval.

Figure 19:
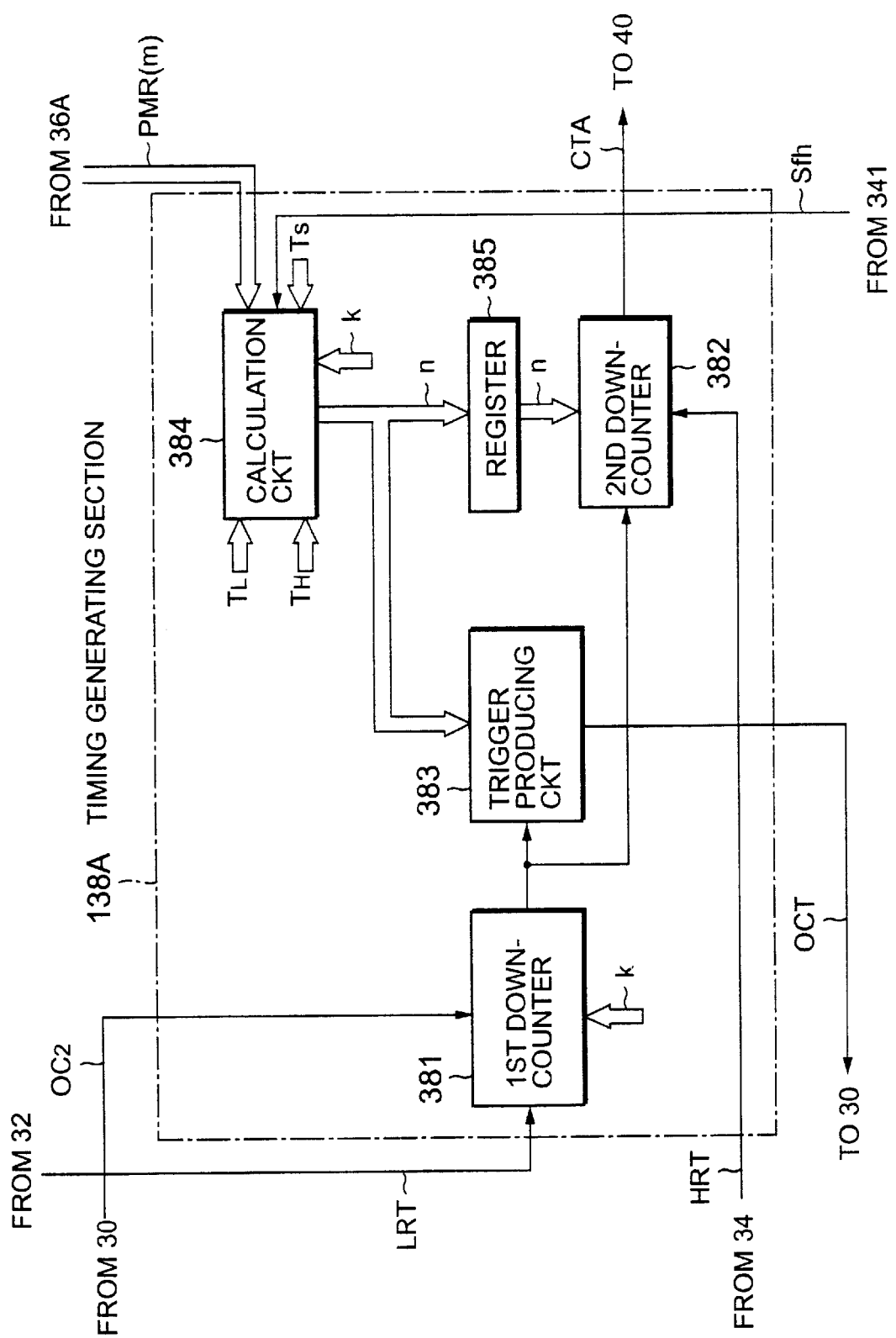
FIG. 19 is a block diagram of a timing generating section for use in the synchronous timing notifying section illustrated in FIG. 17.

Turning to FIG. 19, the timing generating section 38A comprises not only the first and the second down-counters 381 and 382 and the trigger producing circuit 383 but also a calculation circuit 384 and a register 385. In the similar manner as described in conjunction with FIG. 7, the calculation circuit 384 calculates the calculated value n (=INT $((Ts-kT_L+mT_H)/T_H)$). The calculated value n is held in the register 385 as a held value. The held value n is supplied to the second down counter 382. Thereafter, in the similar manner as described in conjunction with FIG. 8, the timing generating section 38A generates the operation control trigger signal OCT and the despreading code timing adjustment signal CTA.

At any rate, the timing generating section 38A calculates the high-resolution compensation time interval $nT_H$ using the reception operation stop time interval Ts, the starting difference time interval $mT_H$, and the low-resolution use time interval $kT_L$ to obtain a calculated result signal indicative of the high-resolution compensation time interval $nT_H$. Subsequently, responsive to the calculated result signal, the timing generating section 38A counts timings for production of the operation control trigger signal OCT and the despreading code timing adjustment signal CTA on the basis of the low-resolution timing signal LRT and the high-resolution timing signal HRT. The timing generating section 38A supplies the operation control section 30 and the timing control section 40 with the operation control trigger signal OCT and the despreading code timing adjustment signal CTA.

In addition, the calculation circuit 384 is operable as a calculation circuit for calculating the high-resolution compensation time interval $nT_H$ using the reception operation stop time interval Ts, the first held time interval $mT_H$, and the low-resolution use time interval $kT_L$ to produce the calculated result signal indicative of the high-resolution compensation time interval $nT_H$. The first down-counter 381 serves as a low-resolution use time interval timer for timing, in synchronism with the low-resolution timing signal LRT, a first elapsed time duration from the stating time instant of the low-resolution use time interval $kT_L$ to produce a first time-out signal when the first elapsed time duration amounts to the low-resolution use time interval $kT_L$. Responsive to the calculated result signal, the trigger producing circuit 383 produces the operation control trigger signal OCT indicative of the operation stop of the high-resolution time reference generating section 34. Responsive to the first time-out signal, the trigger producing circuit 383 produces the operation control trigger signal OCT indicative of the operation start of the high-resolution time reference generating section 34. The register 385 acts as a second register for holding the high-resolution compensation time interval as a second held time interval. The second down-counter 382 is operable as a high-resolution compensation time interval timer which is connected to the low-resolution use time interval timer 381, the second register 385, and the high-resolution time reference generating section 34. Responsive to the first time-out signal, the high-resolution compensation time interval timer times, in synchronism with the high-resolution timing signal HRT, a second elapsed time duration from an expiry time instant of the low-resolution use time interval $kT_L$ to produce a second time-out signal as the despreading code timing adjustment signal CTA when the second elapsed time duration amounts to the second held time interval.

While this invention has thus far been described in conjunction with preferred embodiments thereof, it will now be readily possible for those skilled in the art to put this invention into various other manners. For example, although the up-counter 361 in the phase measurement section starts the up-count operation in response to the edge of the low-resolution timing signal LRT and stops the up-count operation in response to the despreading code timing signal DCT as illustrated in FIG. 4E, the up-counter 361 may start the up-count operation in response to the despreading code timing signal DCT and may stop the up-count operation in response to the edge of the low-resolution timing signal LRT as illustrated in FIG. 20E. In this event, the predetermined positive integer k may preferably be selected as follows:

$$k=INT((Ts-Tc)/T_L).$$

In addition, the low-resolution period $T_L$ may desirably be selected so as to satisfy a relationship among the reception operation stop time interval Ts, the chip duration Tc, the predetermined positive integer k, and the low-resolution period $T_L$ as follow:

$$(Ts-2Tc)<kT_L \leq (Ts-Tc).$$

Under the circumstances, the calculated value n is represented by as follows:

$$n=INT((Ts-kT_L-mT_H)/T_H).$$

What is claimed is:

1. A code division multiple access (CDMA) receiver for intermittently receiving a spread spectrum received signal using a despreading code having a chip duration, said CDMA receiver being alternatively put into a reception operation state and reception operation stop state for an intermittent reception state, the reception operation stop state continuing for a reception operation stop time interval between a reception stop starting time instant and a reception return time instant, said CDMA receiver comprising:
 a high-resolution time reference generating section for generating a high-resolution timing signal having a high-resolution period which is shorter than the chip duration;
 a low-resolution time reference generating section for generating a low-resolution timing signal having a low-resolution period which is longer than the high-resolution period;
 a state control section, connected to said high resolution time reference generating section, for putting, for substantially the operation stop time interval, said CDMA receiver into a cold standby state where said high-resolution time reference generating section does not operate while said low-resolution time reference generating section operates, said state control section putting, on or immediately before the reception return time instant, said CDMA receiver into a hot standby state where said high-resolution time reference generating section operates;
 said CDMA receiver further comprising a demodulating section for demodulating the spread spectrum received signal using the despreading code to produce a demodulated signal and a synchronous timing generating section, connected to said demodulating section, for generating a synchronous timing signal for synchronizing said despreading code with the spread spectrum received signal, wherein said state control section comprises:
 a time interval measuring section, connected to said high-resolution time reference generating section and said low-resolution time reference generating section, for measuring the reception operation stop time interval by using a combination of a multiple of the low-resolution period and a multiple of the high-resolution period, said time interval measuring section producing an operation control trigger signal and a despreading code timing adjustment signal in response thereto;
 an operation control section, connected to said time interval measuring section and said high-resolution time reference generating section, for controlling operation of said high-resolution time reference generating section in response to the operation control trigger signal; and
 a notification signal producing section, connected to said time interval measuring section and said synchronous timing generating section, for notifying said synchronous timing generating section of a synchronous timing notification signal in response to the despreading code timing adjustment signal.

2. A CDMA receiver as claimed in claim 1, wherein said time interval measuring section holds a low-resolution use time interval for which said low-resolution time reference generating section is used, the low-resolution use time interval including a time duration for which said CDMA receiver is put into the cold standby, the low-resolution use time interval being k times as large as the low-resolution period, where k represents a predetermined positive integer which is not less than two, said time interval measuring section measuring, in synchronism with the high-resolution timing signal, a starting difference time interval between the reception stop starting time instant and a starting time instant of the low-resolution use time interval, said time interval measuring section calculating a high-resolution compensation time interval on the basis of the reception operation stop time interval, the starting difference time interval, and the low-resolution use time interval, said high-resolution compensation time interval being a time duration for which said CDMA receiver is put into the hot standby state, said time interval measuring section producing the operation control trigger signal indicative of operation stop of said high-resolution time reference generating section at a time when said CDMA receiver is put into the cold standby state, said time interval measuring section producing the operation control trigger signal indicative of operation start of said high-resolution time reference generating section at a time when said CDMA receiver is put into the hot standby state,
 said operation control section making, in response to the operation control trigger signal indicative of the operation stop of said high-resolution time reference generating section, said high-resolution time reference generating section stop operation thereof, said operation control section making, in response to the operation control trigger signal indicative of the operation start of said high-resolution time reference generating section, said high-resolution time reference generating section restart operation thereof.

3. A CDMA receiver as claimed in claim 2, wherein said synchronous timing generating section supplies said notification signal producing section with a current synchronous timing signal indicative of a period of the synchronous timing signal,
 said notification signal producing section supplying, in response to the current synchronous timing signal, said time interval measuring section with a despreading code timing signal, said time measuring section carrying out a measurement operation of the starting difference time interval in response to the despreading code timing signal.

4. A CDMA receiver as claimed in claim 3, wherein said time measuring section comprises:

a phase measurement section, connected to said high-resolution time reference generating section, said low-resolution time reference generating section, and said notification signal producing section, for measuring, in synchronism with the high-resolution timing signal, the starting difference time interval on the basis of the despreading code timing signal and the low-resolution timing signal, said phase measurement section calculating the high-resolution compensation time interval using the reception operation stop time interval, the starting difference time interval, and the low-resolution use time interval, said phase measurement section producing a phase measurement result signal indicative of the high-resolution compensation time interval; and a timing generating section, connected to said high-resolution time reference generating section, said low-resolution time reference generating section, said phase measurement section, said operation control section, and said notification signal producing section, for counting, in response to the phase measurement result signal, timings for production of the operation control trigger signal and the despreading code timing adjustment signal on the basis of the low-resolution timing signal and the high-resolution timing signal, said timing generating section supplying said operation control section and said notification signal producing section with the operation control trigger signal and the despreading code timing adjustment signal, respectively.

5. A CDMA receiver as claimed in claim 4, wherein said phase measurement section comprises:

a starting difference time interval timer, connected to said high-resolution time reference generating section, said low-resolution time reference generating section, and said notification signal producing section, for timing, in synchronism with the high-resolution timing signal, the starting difference time interval between the despreading code timing signal and the starting time instant of the low-resolution use time interval in response to the low-resolution timing signal and the despreading code timing signal;

a calculating circuit, connected to said starting difference time interval timer, for calculating the high-resolution compensation time interval using the reception operation stop time interval, the starting difference time interval, and the low-resolution use time interval; and a register, connected to said calculation circuit, for holding the high-resolution compensation time interval as a held time interval, said register producing the phase measurement result signal indicative of the held time interval.

6. A CDMA receiver as claimed in claim 5, wherein said timing generating section comprises:

a low-resolution use time interval timer, connected to said low-resolution time reference time generating section, for timing, in synchronism with the low-resolution timing signal, a first elapsed time duration from the starting time instant of the low-resolution use time interval, said low-resolution use time interval timer producing a first time-out signal when the first elapsed time duration amounts to the low-resolution use time interval;

a trigger producing circuit, connected to said low-resolution use time interval timer and said phase measurement section, for producing the operation control trigger signal indicative of the operation stop of said high-resolution time reference generating section in response to the phase measurement result signal, said trigger producing circuit producing the operation control trigger signal indicative of the operation start of said high-resolution time reference generating section in response to the first time-out signal; and a high-resolution compensation time interval timer, connected to said low-resolution use time interval timer, said phase measurement section, and said high-resolution time reference generating section, for timing, in synchronism with the high-resolution timing signal, a second elapsed time duration from an expiry time instant of the low-resolution use time interval, said high-resolution compensation time interval timer producing a second time-out signal as the despreading code timing adjustment signal when the second elapsed time duration amounts to the high-resolution compensation time interval.

7. A CDMA receiver as claimed in claim 5, wherein said starting difference time interval timer comprises an up-counter for starting, in synchronism with the high-resolution timing signal, an up-count operation in response to an edge of the low-resolution timing signal and for stopping the up-count operation in response to the despreading code timing signal, said up-counter producing an up-counted value indicative of the starting difference time interval, said calculation circuit calculating a calculated value indicative of the high-resolution compensation time interval using the reception operation stop time interval, the starting difference time interval, the low-resolution use time interval, and the high-resolution period, said register holding the calculated value as a held value to produce the held value as the phase measurement result signal.

8. A CDMA receiver as claimed in claim 7, wherein said timing generating section comprises:

a first down-counter, connected to said low-resolution time reference time generating section and provided with the predetermined positive integer, for carrying out, in synchronism with the low-resolution timing signal, a first down-count operation on a first down-counted value from the predetermined positive integer, said first down-counter producing a first countdown end signal when the first down-counted value is equal to zero;

a trigger producing circuit, connected to said first down-counter and said phase measurement section, for producing the operation control trigger signal indicative of the operation stop of said-high-resolution time reference generating section in response to the phase measurement result signal, said trigger producing circuit producing the operation control trigger signal indicative of the operation start of said high-resolution time reference generating section in response to the first countdown end signal; and a second down-counter, connected to said first down-counter, said phase measurement section, and said high-resolution time reference time generating section, for carrying out, in synchronism with the high-resolution timing signal, a second down-count operation on a second down-counted value from the calculated value in response to the first countdown end signal, said second down-counter producing a second countdown end signal as the despreading code timing adjustment signal when the second down-counted value is equal to zero.

9. A CDMA receiver as claimed in claim 8, wherein said predetermined positive integer k is represented by an expression as follows:

$$k=INT(Ts/T_L),$$

where a symbol INT(x) represents an integer part of a value of x, Ts represents the reception operation stop time interval, and $T_L$ represents the low-resolution period.

10. A CDMA receiver as claimed in claim 9, wherein said low-resolution use time interval ($kT_L$) is a time interval obtained by multiplying the predetermined positive integer (k) by the low-resolution period ($T_L$).

11. A CDMA receiver as claimed in claim 10, wherein said starting difference time interval ($mT_H$) is a time interval obtained by multiplying the up-counted value (m) by the high-resolution period ($T_H$).

12. A CDMA receiver as claimed in claim 11, wherein said calculated value depicted at n is represented by an expression as follows:

$$n=INT((Ts-kT_L+mT_H)/T_H).$$

13. A CDMA receiver as claimed in claim 12, wherein said high-resolution compensation time interval ($nT_H$) is a time interval obtained by multiplying the calculated value (n) by the high-resolution period ($T_H$).

14. A CDMA receiver as claimed in claim 10, wherein said low-resolution period ($T_L$) is selected so as to satisfy a relationship among the reception operation stop time interval (Ts), the chip duration depicted at Tc, the predetermined positive integer (k), and the low-resolution period ($T_L$) as follow:

$$(Ts-Tc)<kT_L \leq Ts.$$

15. A CDMA receiver as claimed in claim 5, wherein said starting difference time interval timer comprises an up-counter for starting, in synchronism with the high-resolution timing signal, an up-count operation in response to the despreading code timing signal and for stopping the up-count operation in response to an edge of the low-resolution timing signal, said up-counter producing an up-counted value indicative of the starting difference time interval, said calculation circuit calculating a calculated value indicative of the high-resolution compensation time interval using the reception operation stop time interval, the starting difference time interval, the low-resolution use time interval, and the high-resolution period, said register holding the calculated value as a held value to produce the held value as the phase measurement result signal.

16. A CDMA receiver as claimed in claim 15, wherein said timing generating section comprises:

a first down-counter, connected to said low-resolution time reference time generating section and given with the predetermined positive integer, for carrying out, in synchronism with the low-resolution timing signal, a first down-count operation on a first down-counted value from the predetermined positive integer, said first down-counter producing a first countdown end signal when the first down-counted value is equal to zero;

a trigger producing circuit, connected to said first down-counter and said phase measurement section, for producing the operation control trigger signal indicative of the operation stop of said high-resolution time reference generating section in response to the phase measurement result signal, said trigger producing circuit producing the operation control trigger signal indicative of the operation start of said high-resolution time reference generating section in response to the first countdown end signal; and a second down-counter, connected to said first down-counter, said phase measurement section, and said high-resolution time reference time generating section, for carrying out, in synchronism with the high-resolution timing signal, a second down-count operation on a second down-counted value from the calculated value in response to the first countdown end signal, said second down-counter producing a second countdown end signal as the despreading code timing adjustment signal when the second down-counted value is equal to zero.

17. A CDMA receiver as claimed in claim 15, wherein said predetermined positive integer k is represented by an expression as follows:

$$k=INT((Ts-Tc)/T_L),$$

where a symbol INT(x) represents an integer part of a value of x, Ts represents the reception operation stop time interval, Tc represents the chip duration, and $T_L$ represents the low-resolution period.

18. A CDMA receiver as claimed in claim 17, wherein said low-resolution use time interval ($kT_L$) is a time interval obtained by multiplying the predetermined positive integer (k) by the low-resolution period ($T_L$).

19. A CDMA receiver as claimed in claim 18, wherein said starting difference time interval ($mT_H$) is a time interval obtained by multiplying the up-counted value (m) by the high-resolution period ($T_H$).

20. A CDMA receiver as claimed in claim 19, wherein said calculated value depicted at n is represented by an expression as follows:

$$n=INT\ ((Ts-kT_L-mT_H)\ /T_H).$$

21. A CDMA receiver as claimed in claim 20, wherein said high-resolution compensation time interval ($nT_H$) is a time interval obtained by multiplying the calculated value (n) by the high-resolution period ($T_H$).

22. A CDMA receiver as claimed in claim 18, wherein said low-resolution period ($T_L$) is selected so as to satisfy a relationship among the reception operation stop time interval (Ts), the chip duration (Tc), the predetermined positive integer (k), and the low-resolution period ($T_L$) as follow:

$$(Ts-2Tc)<kT_L \leq (Ts-Tc).$$

23. A CDMA receiver as claimed in claim 3, wherein said time measuring section comprises:

a phase measurement section, connected to said high-resolution time reference generating section, said low-resolution time reference generating section, and said notification signal producing section, for measuring, in synchronism with the high-resolution timing signal, the starting difference time interval on the basis of the despreading code timing signal and the low-resolution timing signal, said phase measurement section producing a phase measurement result signal indicative of the starting difference time interval; and a timing generating section, connected to said high-resolution time reference generating section, said low-resolution time reference generating section, said phase measurement section, said operation control section, and said notification signal producing section, for calculating the high-resolution compensation time interval using the reception operation stop time interval, the starting difference time interval, and the low-resolution use time interval to obtain a calculated result signal indicative of the high-resolution compensation time interval, said timing generating section counting, in response to the calculated result signal, timings for production of the operation control trigger signal and the despreading code timing adjustment signal on the basis of the low-resolution timing signal and the high-resolution timing signal, said timing generating section supplying said operation control section and said notification signal producing section with the operation control trigger signal and the despreading code timing adjustment signal, respectively.

24. A CDMA receiver as claimed in claim 23, wherein said phase measurement section comprises:

a starting difference time interval timer, connected to said high-resolution time reference generating section, said low-resolution time reference generating section, and said notification signal producing section, for timing, in synchronism with the high-resolution timing signal, the starting difference time interval between the despreading code timing signal and the starting time instant of the low-resolution use time interval in response to the low-resolution timing signal and the despreading code timing signal; and a first register, connected to said start difference time interval timer, for holding the starting difference time interval as a first held time interval, said first register producing the phase measurement result signal indicative of the first held time interval.

25. A CDMA receiver as claimed in claim 24, wherein said timing generating section comprises:

a calculating circuit, connected to said first register, for calculating the high-resolution compensation time interval using the reception operation stop time interval, the first held time interval, and the low-resolution use time interval to produce the calculated result signal indicative of the high-resolution compensation time interval;

a low-resolution use time interval timer, connected to said low-resolution time reference time generating section, for timing, in synchronism with the low-resolution timing signal, a first elapsed time duration from the starting time instant of the low-resolution use time interval, said low-resolution use time interval timer producing a first time-out signal when the first elapsed time duration amounts to the low-resolution use time interval;

a trigger producing circuit, connected to said low-resolution use time interval timer and said calculating section, for producing the operation control trigger signal indicative of the operation stop of said high-resolution time reference generating section in response to the calculated result signal, said trigger producing circuit producing the operation control trigger signal indicative of the operation start of said high-resolution time reference generating section in response to the first time-out signal;

a second register, connected to said calculating circuit, for holding the high-resolution compensation time interval as a second held time interval; and a high-resolution compensation time interval timer, connected to said low-resolution use time interval timer, said second register, and said high-resolution time reference generating section, for timing, in synchronism with the high-resolution timing signal, a second elapsed time duration from an expiry time instant of the low-resolution use time interval, said high-resolution compensation time interval timer producing a second time-out signal as the despreading code timing adjustment signal when the second elapsed time duration amounts to the second held time interval.

26. A CDMA receiver as claimed in claim 24, wherein said starting difference time interval timer comprises an up-counter for starting, in synchronism with the high-resolution timing signal, an up-count operation in response to an edge of the low-resolution timing signal and for.stopping the up-count operation in response to the despreading code timing signal, said up-counter producing an up-counted value indicative of the starting difference time interval, said first register holding the up-counted value as a first held value to produce the first held value as the phase measurement result signal.

27. A CDMA receiver as claimed in claim 26, wherein said timing generating section comprises:

a calculation circuit, connected to said first register, for calculating a calculated value indicative of the high-resolution compensation time interval using the reception operation stop time interval, the starting difference time interval, the low-resolution use time interval, and the high-resolution period to produce a calculated result signal indicative of the calculated value;

a first down-counter, connected to said low-resolution time reference generating section and provided with the predetermined positive integer, for carrying out, in synchronism with the low-resolution timing signal, a first down-count operation on a first down-counted value from the predetermined positive integer, said first down-counter producing a first countdown end signal when the first down-counted value is equal to zero;

a trigger producing circuit, connected to said first down-counter and said calculation circuit, for producing the operation control trigger signal indicative of the operation stop of said high-resolution time reference generating section in response to the calculated result signal, said trigger producing circuit producing the operation control trigger signal indicative of the operation start of said high-resolution time reference generating section in response to the first countdown end signal;

a second register, connected to said calculation circuit, for holding the calculated value as a second held value; and a second down-counter, connected to said first down-counter, said second register, and said high-resolution time reference time generating section, for carrying out, in synchronism with the high-resolution timing signal, a second down-count operation on a second down-counted value from the second held value in response to the first countdown end signal, said second down-counter producing a second countdown end signal as the despreading code timing adjustment signal when the second down-counted value is equal to zero.

28. A CDMA receiver as claimed in claim 27, wherein said predetermined positive integer k is represented by an expression as follows:

$$k = INT(Ts/T_L),$$

where a symbol INT(x) represents an integer part of a value of x, Ts represents the reception operation stop time interval, and $T_L$ represents the low-resolution period.

29. A CDMA receiver as claimed in claim 28, wherein said low-resolution use time interval ($kT_L$) is a time interval obtained by multiplying the predetermined positive integer (k) by the low-resolution period ($T_L$).

30. A CDMA receiver as claimed in claim 29, wherein said starting difference time interval ($mT_H$) is a time interval obtained by multiplying the up-counted value (m) by the high-resolution period ($T_H$).

31. A CDMA receiver as claimed in claim 30, wherein said calculated value depicted at n is represented by an expression as follows:

$$n=INT((Ts-kT_L+mT_H)/T_H).$$

32. A CDMA receiver as claimed in claim 31, wherein said high-resolution compensation time interval ($nT_H$) is a time interval obtained by multiplying the calculated value (n) by the high-resolution period ($T_H$).

33. A CDMA receiver as claimed in claim 29, wherein said low-resolution period ($T_L$) is selected so as to satisfy a relationship among the reception operation stop time interval (Ts), the chip duration depicted at Tc, the predetermined positive integer (k), and the low-resolution period ($T_L$) as follow:

$$(Ts-Tc)<kT_L \leq Ts.$$

34. A CDMA receiver as claimed in claim 24, wherein said starting difference time interval timer comprises an up-counter for starting, in synchronism with the high-resolution timing signal, an up-count operation in response to the despreading code timing signal and for stopping the up-count operation in response to an edge of the low-resolution timing signal, said up-counter producing an up-counted value indicative of the starting difference time interval, said first register holding the up-counted value as a first held value to produce the first held value as the phase measurement result signal.

35. A CDMA receiver as claimed in claim 34, wherein said timing generating section comprises:

a calculation circuit, connected to said first register, for calculating a calculated value indicative of the high-resolution compensation time interval using the reception operation stop time interval, the starting difference time interval, the low-resolution use time interval, and the high-resolution period to produce a calculated result signal indicative the calculated value;

a first down-counter, connected to said low-resolution time reference time generating section and provided with the predetermined positive integer, for carrying out, in synchronism with the low-resolution timing signal, a first down-count operation on a first down-counted value from the predetermined positive integer, said first down-counter producing a first countdown end signal when the first down-counted value is equal to zero;

a trigger producing circuit, connected to said first down-counter and said calculation circuit, for producing the operation control trigger signal indicative of the operation stop of said high-resolution time reference generating section in response to the calculated result signal, said trigger producing circuit producing the operation control trigger signal indicative of the operation start of said high-resolution time reference generating section in response to the first countdown end signal;

a second register, connected to said calculation circuit, for holding the calculated value as a second held value; and a second down-counter, connected to said first down-counter, said second register, and said high-resolution time reference time generating section, for carrying out, in synchronism with the high-resolution timing signal, a second down-count operation on a second down-counted value from the second held value in response to the first countdown end signal, said second down-counter producing a second countdown end signal as the despreading code timing adjustment signal when the second down-counted value is equal to zero.

36. A CDMA receiver as claimed in claim 35, wherein said predetermined positive integer k is represented by an expression as follows:

$$k=INT((Ts-Tc)/T_L),$$

where a symbol INT (x) represents an integer part of a value of x, Ts represents the reception operation stop time interval, Tc represents the chip duration, and $T_L$ represents the low-resolution period.

37. A CDMA receiver as claimed in claim 36, wherein said low-resolution use time interval ($kT_L$) is a time interval obtained by multiplying the predetermined positive integer (k) by the low-resolution period ($T_L$).

38. A CDMA receiver as claimed in claim 37, wherein said starting difference time interval ($mT_H$) is a time interval obtained by multiplying the up-counted value (m) by the high-resolution period ($T_H$).

39. A CDMA receiver as claimed in claim 38, wherein said calculated value depicted at n is represented by an expression as follows:

$$n=INT((Ts-kT_L-mT_H)/T_H).$$

40. A CDMA receiver as claimed in claim 39, wherein said high-resolution compensation time interval ($nT_H$) is a time interval obtained by multiplying the calculated value (n) by the high-resolution period ($T_H$).

41. A CDMA receiver as claimed in claim 37, wherein said low-resolution period ($T_L$) is selected so as to satisfy a relationship among the reception operation stop time interval (Ts), the chip duration (Tc), the predetermined positive integer (k), and the low-resolution period ($T_L$) as follow:

$$(Ts-2Tc)<kT_L \leq (Ts-Tc).$$

42. A CDMA receiver as claimed in claim 2, wherein further comprises a frequency correcting section, connected to said low-resolution time reference generating section and said high-resolution time reference generating section, for correcting a frequency of the low-resolution timing signal using the high-resolution timing signal.

43. A CDMA receiver as claimed in claim 42, wherein said frequency correcting section is provided with the reception operation stop time interval, said frequency correcting section controlling the frequency of the low-resolution timing signal so that the starting difference time interval is substantially equal to the high-resolution compensation time interval.

44. A CDMA receiver as claimed in claim 3, wherein further comprises a frequency correcting section, connected to said low-resolution time reference generating section, said high-resolution time reference generating section, and said notification signal producing section, for correcting a frequency and a phase of the low-resolution timing signal using the high-resolution timing signal and the despreading code timing signal.

45. A CDMA receiver as claimed in claim 44, wherein said frequency correcting section is provided with the reception operation stop time interval, said frequency correcting section controlling the frequency and the phase of the low-resolution timing signal so that each of the starting difference time interval and the high-resolution compensation time interval is substantially equal to zero.

46. A receiver for intermittently receiving a received signal, said receiver being alternatively put into a reception operation state and a reception operation stop state for an intermittent reception state, the reception operation stop state continuing for a reception operation stop time interval between a reception stop starting time instant and a reception return time instant, said receiver comprising:

- a high-resolution time reference generating section for generating a high-resolution timing signal having a high-resolution period;
- a low-resolution time reference generating section for generating a low-resolution timing signal having a low-resolution period which is longer than the high-resolution period; and
- a state control section, connected to said high-resolution time reference generating section, for putting, for substantially the operation stop time interval, said receiver into a cold standby state where said high-resolution time reference generating section does not operate while said low-resolution time reference generating section operates, said state control section putting, on or immediately before the reception return time instant, said receiver into a hot standby state where said high-resolution time reference generating section operates;
- said receiver further comprising a demodulating section for demodulating the spread spectrum received signal using the despreading code to produce a demodulated signal and a synchronous timing generating section, connected to said demodulating section, for generating a synchronous timing signal for synchronizing said despreading code with the spread spectrum received signal, wherein said state control section comprises:
- a time interval measuring section, connected to said high-resolution time reference generating section and said low-resolution time reference generating section, for measuring the reception operation stop time interval by using a combination of a multiple of the low-resolution period and a multiple of the high-resolution period, said time interval measuring section producing an operation control trigger signal and a despreading code timing adjustment signal in response thereto;
- an operation control section, connected to said time interval measuring section and said high-resolution time reference generating section, for controlling operation of said high-resolution time reference generating section in response to the operation control trigger signal; and
- a notification signal producing section, connected to said time interval measuring section and said synchronous timing generating section, for notifying said synchronous timing generating section of a synchronous timing notification signal in response to the despreading code timing adjustment signal.

47. A method of intermittently receiving a spread spectrum received signal using a despreading code having a chip duration in a code division multiple access (CDMA) receiver which is alternately put into a reception operation state and a reception operation stop state for an intermittent reception state, the reception operation stop state continuing for a reception operation stop time interval between a reception stop starting time instant and a reception return time instant, said CDMA receiver comprising a high-resolution time reference generating section for generating a high-resolution timing signal having a high-resolution period which is shorter than the chip duration and a low-resolution time reference generating section for generating a low-resolution timing signal having a low-resolution period which is longer than the high-resolution period, said method comprising the steps of:

- putting, for substantially the reception operation stop time interval, said CDMA receiver into a cold standby state where said high-resolution time reference generating section does not operate while said low-resolution time reference generating section operates; and
- putting, on or immediately before the reception return time instant, said CDMA receiver into a hot standby state where said high-resolution time reference generating section operates;
- demodulating the spread spectrum received signal using the despreading code to produce a demodulated signal;
- generating a synchronous timing signal for synchronizing said despreading code with the spread spectrum received signal;
- measuring the reception operation stop time interval by using a combination of a multiple of the low-resolution period and a multiple of the high-resolution period, and producing an operation control trigger signal and a despreading code timing adjustment signal in response thereto;
- controlling operation of said high-resolution time reference generating section in response to the operation control trigger signal; and
- notifying said synchronous timing generating section of a synchronous timing notification signal in response to the despreading code timing adjustment signal.

48. A method of intermittently receiving a received signal in a receiver which is alternatively put into a reception operation state and a reception operation stop state for an intermittent reception state, the reception operation stop state continuing for a reception operation stop time interval between a reception stop starting time instant and a reception return time instant, said receiver comprising a high-resolution time reference generating section for generating a high-resolution timing signal having a high-resolution period and a low-resolution time reference generating section for generating a low-resolution time reference generating section for generating a low-resolution timing signal having a low-resolution period which is longer than the high-resolution period, said method comprising the steps of:

- putting, for substantially the reception operation stop time interval, said receiver into a cold standby state where said high-resolution time reference generating section does not operate while said low-resolution time reference generating section operates; and putting, on or immediately before the reception return time instant, said receiver into a hot standby state where said high-resolution time reference generating section operates;
- demodulating the spread spectrum received signal using the despreading code to produce a demodulated signal;
- generating a synchronous timing signal for synchronizing said despreading code with the spread spectrum received signal;
- measuring the reception operation stop time interval by using a combination of a multiple of the low-resolution period and a multiple of the high-resolution period, and producing an operation control trigger signal and a despreading code timing adjustment signal in response thereto;
- controlling operation of said high-resolution time reference generating section in response to the operation control trigger signal; and
- notifying said synchronous timing generating section of a synchronous timing notification signal in response to the despreading code timing adjustment signal.

* * * * *